United States Patent
Miroshnichenko et al.

(10) Patent No.: US 8,914,567 B2
(45) Date of Patent: Dec. 16, 2014

(54) STORAGE MANAGEMENT SYSTEM FOR VIRTUAL MACHINES

(75) Inventors: Alex Miroshnichenko, San Francisco, CA (US); Serge Pashenkov, Redwood City, CA (US); Serge Shats, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 757 days.

(21) Appl. No.: 12/559,103

(22) Filed: Sep. 14, 2009

(65) Prior Publication Data

US 2010/0153617 A1    Jun. 17, 2010

Related U.S. Application Data

(60) Provisional application No. 61/096,918, filed on Sep. 15, 2008.

(51) Int. Cl.
*G06F 12/00* (2006.01)
*G06F 3/06* (2006.01)

(52) U.S. Cl.
CPC .............. *G06F 3/0664* (2013.01); *G06F 3/061* (2013.01); *G06F 3/067* (2013.01); *G06F 3/0635* (2013.01)
USPC ...................................... 711/6; 711/E12.001

(58) Field of Classification Search
USPC ............................................................ 711/6
See application file for complete search history.

(56) References Cited

U.S. PATENT DOCUMENTS

| | | | |
|---|---|---|---|
| 5,522,075 A * | 5/1996 | Robinson et al. ............. | 718/100 |
| 5,729,710 A | 3/1998 | Magee et al. | |
| 7,281,102 B1 | 10/2007 | Agesen et al. | |
| 2005/0120160 A1 | 6/2005 | Plouffe et al. | |
| 2006/0064441 A1* | 3/2006 | Yamamoto ..................... | 707/201 |
| 2006/0070067 A1* | 3/2006 | Lowery .......................... | 718/100 |
| 2006/0085784 A1* | 4/2006 | Traut et al. ...................... | 718/1 |
| 2008/0155169 A1 | 6/2008 | Hiltgen et al. | |
| 2008/0184218 A1 | 7/2008 | Largman et al. | |
| 2008/0222375 A1* | 9/2008 | Kotsovinos et al. .......... | 711/162 |
| 2009/0300599 A1* | 12/2009 | Piotrowski ..................... | 717/174 |

OTHER PUBLICATIONS

International Search Report and Written Opinion, PCT Application No. PCT/US09/056844, Oct. 23, 2009, 10 pages.
European Supplementary Search Report, European Application No. 09813754.0, Oct. 8, 2012, 9 pages.

* cited by examiner

*Primary Examiner* — Larry Mackall

(57) ABSTRACT

A computer system (a method) for providing storage management solution that enables server virtualization in data centers is disclosed. The system comprises a plurality of storage devices for storing data and a plurality of storage management drivers configured to provide an abstraction of the plurality of the storage devices to one or more virtual machines of the data center. A storage management driver is configured to represent a live disk or a snapshot of a live disk in a virtual disk image to the virtual machine associated with the driver. The driver is further configured to translate a logical address for a data block to one or more physical addresses of the data block through the virtual disk image. The system further comprises a master server configured to manage the abstraction of the plurality of the storage devices and to allocate storage space to one or more virtual disk images.

25 Claims, 21 Drawing Sheets

STORAGE MANAGEMENT SYSTEM FOR VIRTUAL MACHINES

CROSS-REFERENCE TO RELATED APPLICATIONS

The present application claims priority under 35 U.S.C. §119(e) to U.S. Provisional Patent Application No. 61/096,918, filed on Sep. 15, 2008, entitled "STORAGE MANAGEMENT SYSTEM FOR VIRTUAL MACHINES" which is incorporated by reference in its entirety.

BACKGROUND OF THE INVENTION

1. Field of the Invention

The invention relates generally to virtualization of computer resources. Particularly, the invention relates to providing a storage solution that enables server virtualization in data centers.

2. Description of the Background Art

Server virtualization is the masking of server resources, including the number and identifications of individual physical servers, processors and operating systems, from server users. Server virtualization can be used to make more efficient use of server resources, to improve server availability, and to assist in data backup, testing and development in data centers. Traditionally, server virtualization in a data center depends on a hypervisor and a virtual machine monitor to perform desired operations in the data center, such as monitoring memory pages as seen by a guest operation system (OS), copying data from memory pages in sync with processor registers and persevering all relevant sate of virtual hardware. However, dependence on hypervisor for server virtualization without an optimized storage management leads to system performance that is not scalable for server virtualization in data centers.

Another challenge facing the traditional server virtualization using conventional volume managers to manage data storage is lack of support for managing large volumes of data storage devices, e.g., millions of different volumes of data storage devices. Traditional volume managers deal with relatively few volumes and a simple block map for keeping track of the relatively few volumes. However, complex server virtualization operations, such as taking a snapshot of a whole OS image and continuing its execution at a later time from the exact point it was stopped, consumes a large quantity of data storage space. Traditional volume managers for server virtualization are most likely to fail to provide functionality that complements the needed functionality of server virtualization.

Hence, there is a lack of a system and method that implements data storage with functionality that enables server virtualization in data centers with enhanced system performance.

SUMMARY OF THE INVENTION

The invention overcomes the deficiencies and limitations of the prior art by providing a system and method for virtualization of compute resources in general, and for providing a storage management solution in particular that enables server virtualization in data centers. In one embodiment, the computer system comprises a plurality of storage devices for storing data at the data centers and a plurality of storage management drivers configured to provide an abstraction of the plurality of the storage devices to one or more virtual machines of the data center. A storage management driver is configured to represent a live disk or a snapshot of a live disk in a virtual disk image to the virtual machine associated with the driver. The driver is further configured to translate a logical address for a data block to one or more physical addresses of the data block through the virtual disk image. The system manages the disk space of the plurality of the storage devices in terms of two or more logically divided spaces including a log space, a live space and an optional history space. A plurality of data are written sequentially into the disk space via the log space. The data written into the log space can be flushed into the live space and optionally into the history space for performance optimization. The system further comprises a master service configured to manage the abstraction of the plurality of the storage devices and to allocate storage space to one or more virtual disk images.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
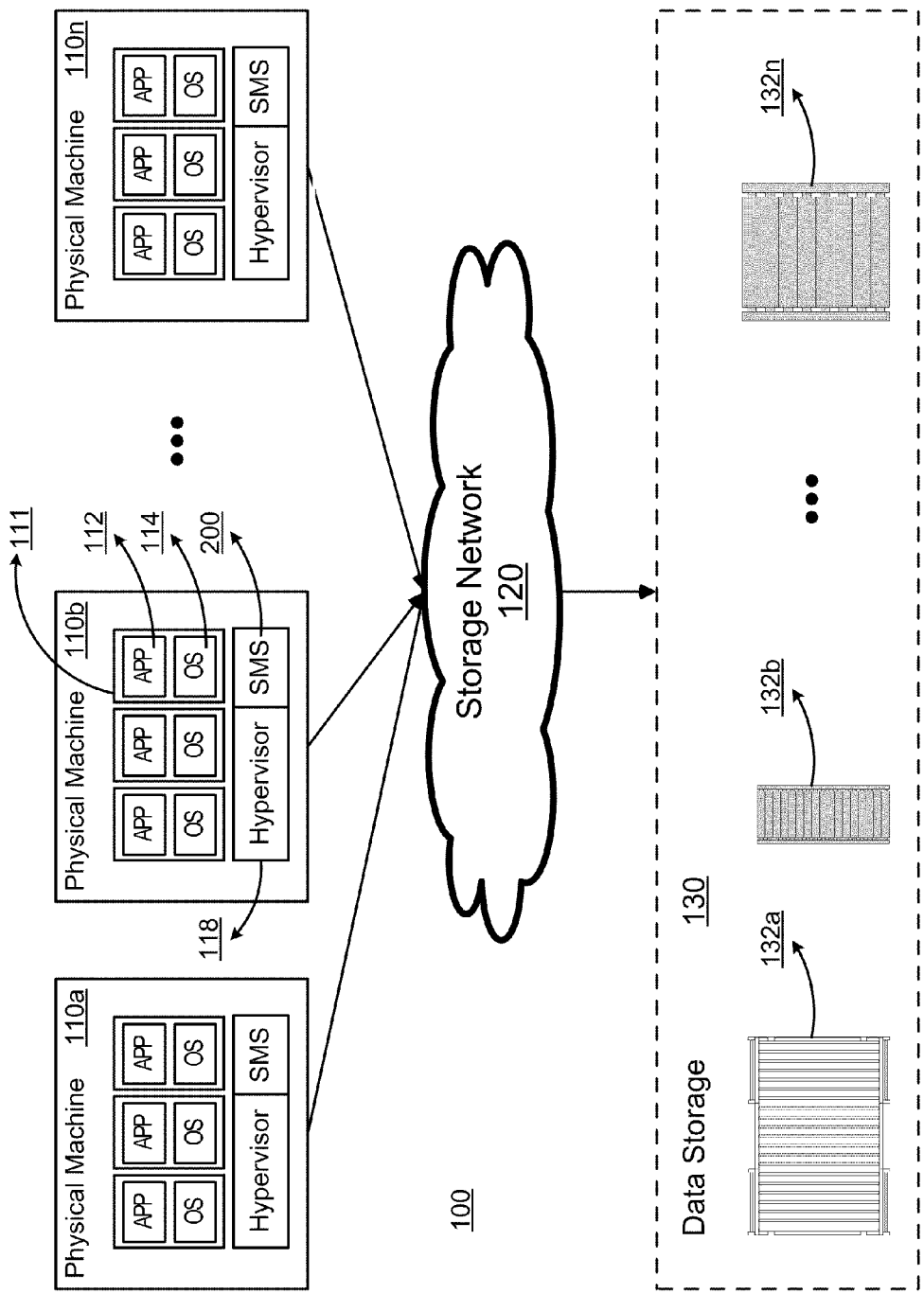
FIG. 1A is a high-level block diagram illustrating a system including a storage management system according to one embodiment of the invention.

A system and method for providing functionality that enables server virtualization in data centers is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the invention is described in one embodiment below with reference to user interfaces and particular hardware. However, the invention applies to any type of computing device that can receive a data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, flash memory including Universal Serial Bus (USB) keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

System Overview

FIG. 1A is a high-level block diagram illustrating a system 100 having storage management systems 200 according to one embodiment of the invention. The environment 100 comprises multiple physical machines 110*a-n* and data storage 130. Physical machines 110*a-n* are connected to the data storage 130 via a storage network 120, such as storage area network (SAN), Internet Small Computer System Interface (iSCSI), Network-attached storage (NAS) and other storage networks known to those of ordinary skills in the art. The data storage 130 comprises one or more homogeneous or heterogeneous computer storage devices 132*a-n*, such as disk arrays, tape libraries, and optical jukeboxes, for storing computer data.

Each physical machine 110*a-n* is divided into multiple isolated virtual environments, also called virtual machines (VMs), or guest virtual machines 111. A guest virtual machine 111 has a guest operating system 114 and one or more software applications 112. Each physical machine 110 runs a hypervisor 118 and a storage management system (SMS) 200. The hypervisor 118, also called virtual machine monitor (VMM), is a computer software/hardware that allows multiple guest operating systems to run concurrently on a physical machine hosting the operating systems. A guest VM 111 also has one or more block devices (not shown in FIG. 1A). These block devices, seen by a guest VM 111 as regular disk devices, such as C: or /dev/sda, are an abstraction of the underlying data storage devices 132a-n provided by the storage management system 200. For each block device visible to a guest VM 111, the SMS 200 manages disk block maps that translate logical addresses in input/output (I/O) requests to physical addresses on the underlying storage devices 132a-n.

SMS 200 does not manage low level storage devices 132 directly, such as disk spindles. Existing technologies, such as logical volume management (LVM) or RAID, can be used to directly manage low level disk spindles. A SMS 200 is logically located above the low level storage devices layer. A SMS 200 treats the low level storage devices as a set of block devices or volumes. Depending on a particular virtualization platform, these block devices can represent individual disk spindles, a RAID aggregation of disk spindles, or intelligent storage devices such as disk arrays. SMS 200 is further described in conjunction with description of FIGS. 2-17.

The block devices are visible to guest VMs 111 from the SMS 200 via hypervisor 118 facilities, which are similar to facilities used by standard Redundant Array of Inexpensive Disks) RAID controllers or other block device drivers. The SMS 200 itself functions as a device driver from hypervisor infrastructure point of view. A SMS 200 instance running on a specific physical machine 110 is called a SMS driver from herein and throughout the entire specification.

Device drivers may run in a special guest OS, for example, dom0 in XEN or simply embedded in hypervisor like device drivers in traditional operating systems in case of VMware systems. Device drivers may also run in isolated specialized VMs, called service domains, which are specifically designed to run device drivers in an insulated address space. In one embodiment, a SMS 200 runs in a service domain to provide abstraction of physical storage to guest VMs. SMS drivers provide a unified view of the block devices that they serve to guest VMs. Multiple SMS drivers do not communicate with each other. Instead, multiple SMS drivers asynchronously communicate with a single cluster-wide management device, master service, to simplify SMS cluster management.

Figure 1B:
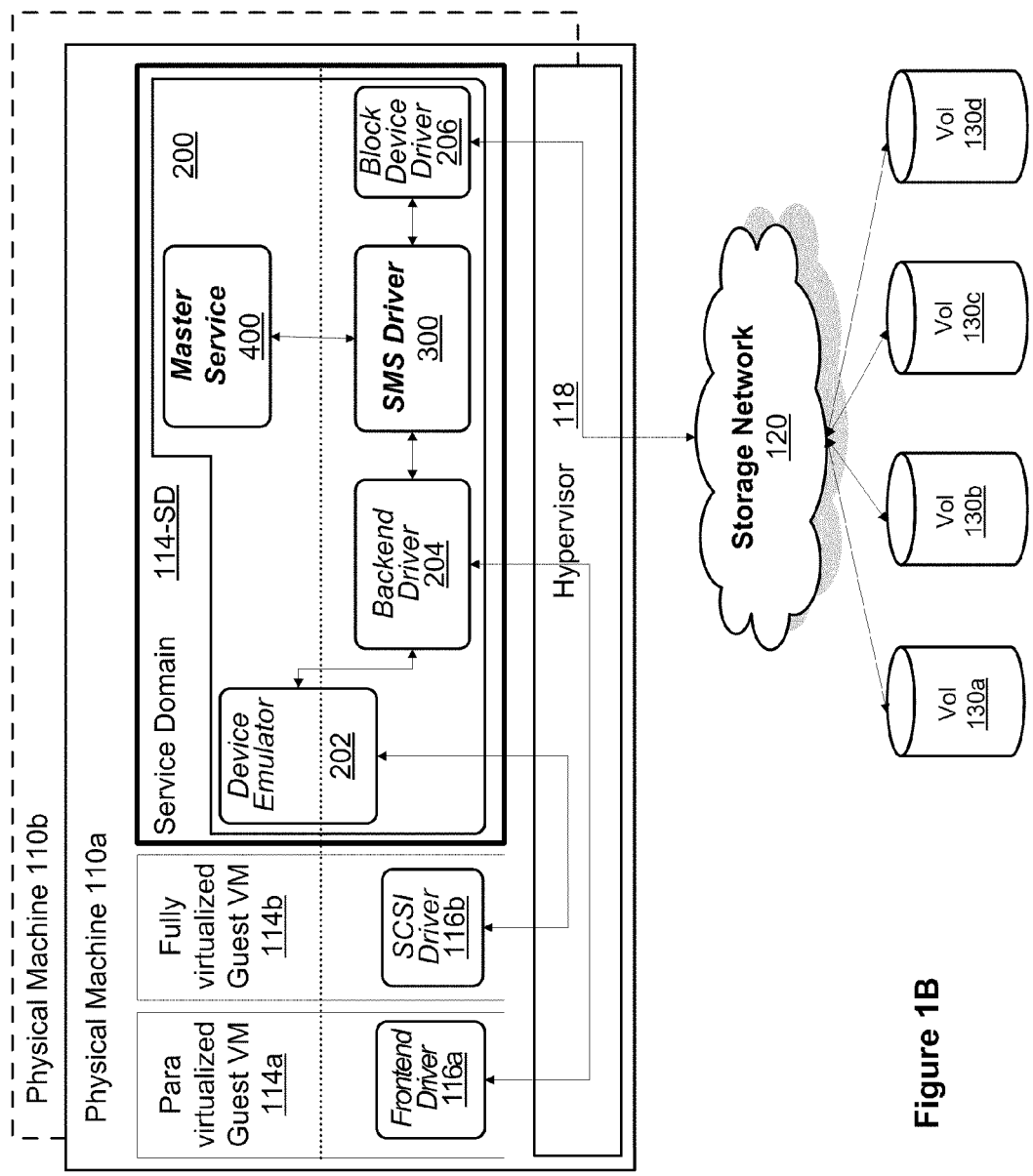
FIG. 1B is a block diagram of the storage management system illustrated in FIG. 1A in an example of a hypervisor runtime environment.

FIG. 1B is a block diagram of the SMS 200 illustrated in FIG. 1A in an example of a hypervisor runtime environment. The runtime environment illustrated in FIG. 1A is for Xen hypervisor, where a SMS 200 runs in an isolated specialized VM, called service domain 114-SD, on each physical machine 110. Only two physical machines 110a-b are illustrated in FIG. 1B for the purpose of simplification. Taking physical machine 110a as an example, in addition to the service domain 114-SD running a SMS 200, the physical machine 110a has a para-virtualized guest VM 114a and a fully virtualized guest VM 114b. Each of the physical machines 110a-b has a hypervisor 118 and the physical machines 110a-b communicate with multiple disk storage devices designated as physical volumes 130a-d via a storage network SAN 120. For simplification, only four physical volumes 130a-d are illustrated in FIG. 1B.

The SMS 200 running in the service domain 114-SD comprises a SMS driver 300, a master service 400, a device emulator 202, a back end driver 204 and a block device driver 206. The SMS 200 presents the abstraction of the physical volumes 130a-d as multiple block devices to the guest VM 114a-b. In the para-virtualized guest VM 114a case, the SMS 200 provides a para-virtual block device driver, e.g., frontend driver 116a, running in the guest VM 114a, and the frontend driver 116a communicates with the backend driver 204. In the fully virtualized guest VM 114b case, the SMS 200 provides a standard block device driver, e.g., small computer system interface (SCSI) driver 116b, to the guest VM 114b. The SCSI driver 116b communicates with an emulated hardware, e.g., device emulator 202, which in turn communicates with the backend driver 204. The backend driver 204 communicates with the SMS driver 300 that translates logical address space to physical addresses on the underlying physical volumes 130a-d responsive to the I/O requests from the backend driver 204. The block device driver 206 reads from and/or writes into the physical volumes 130a-d based on the address space translation from the SMS driver 300.

In addition to address space translation service provided by a SMS driver 300, a SMS 200 also includes a master service 400 to provide various other services, such as virtual disk image (VDI) identifications management and disk space allocation. The master service 400 can run on one of the physical machines in a virtualization platform. The master service 400 is further described in conjunction with descriptions of FIG. 16.

In other embodiments, depending on the features of a particular virtualization platform, SMS 200 runs as an integral part of the hypervisor 118 in monolithic hypervisor runtime environments, such as VMware runtime environment. In VMware runtime environment, SMS 200 operates as a block device driver in a guest OS, similar as hardware RAID controller driver, and presents virtual disk images as block devices to the guest OS. VMware tools can be used to map these block devices to guest OS visible block devices.

Storage Management System 200

Figure 2:
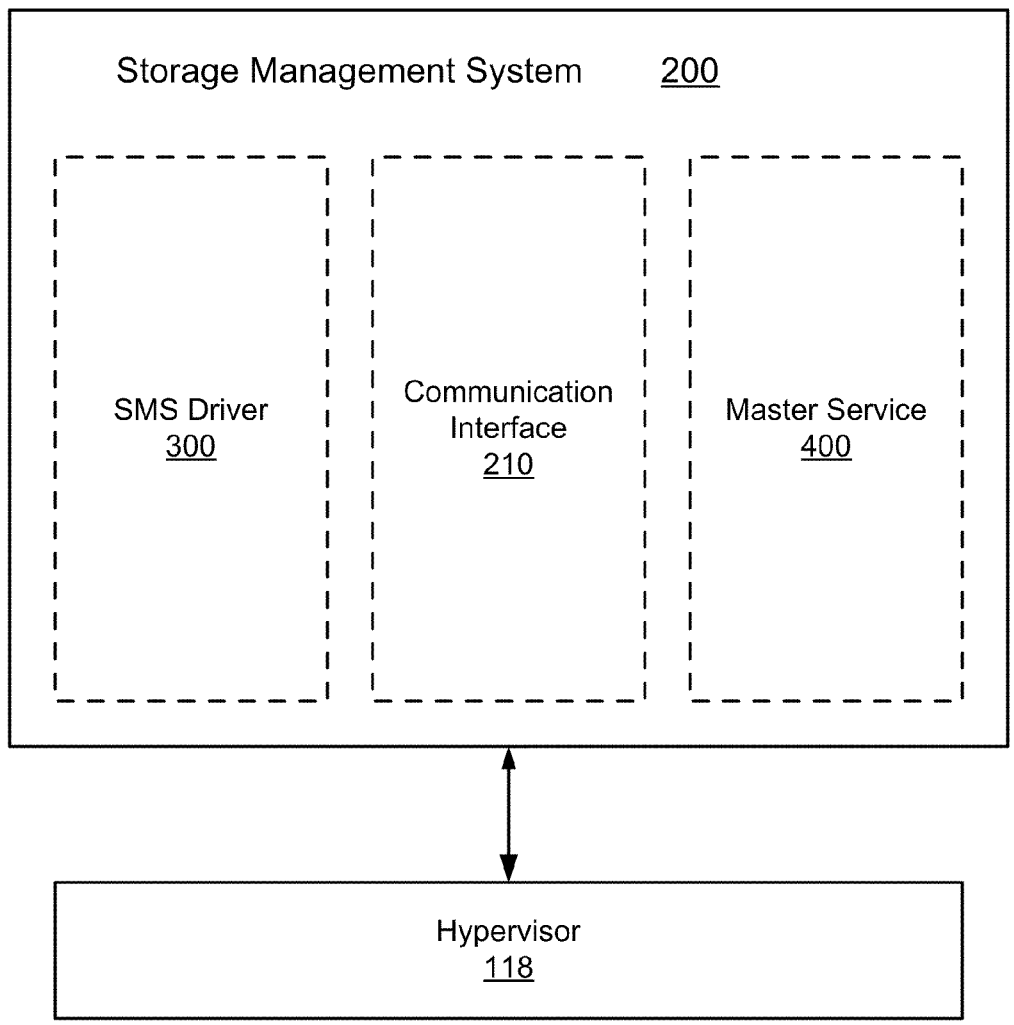
FIG. 2 is a block diagram illustrating modules of a storage management system according to one embodiment of the invention.

Turning now to FIG. 2, FIG. 2 is a block diagram illustrating the modules 300, 210 and 400 of a storage management system 200 according to one embodiment of the invention. The SMS 200 comprises a SMS driver 300, a master service 400 and a communication interface 210. The SMS 200 communicates with a hypervisor 118 via the communication interface 210. The SMS driver 300 translates/maps logical address space to physical address space for each I/O request. The SMS driver 300 communicates with the master service 400 via the communication interface 210. The master service 400 maintains a consistent view of all the mapping information for an entire data storage space. The master service 400 is configured to manage virtual disk image identifications and disk space allocation. The SMS 200 receives an incoming I/O request containing information about the location of the data in terms of logical disk address and translates the incoming I/O request into a new I/O request to the physical disk location via the SMS driver 300.

Figure 3:
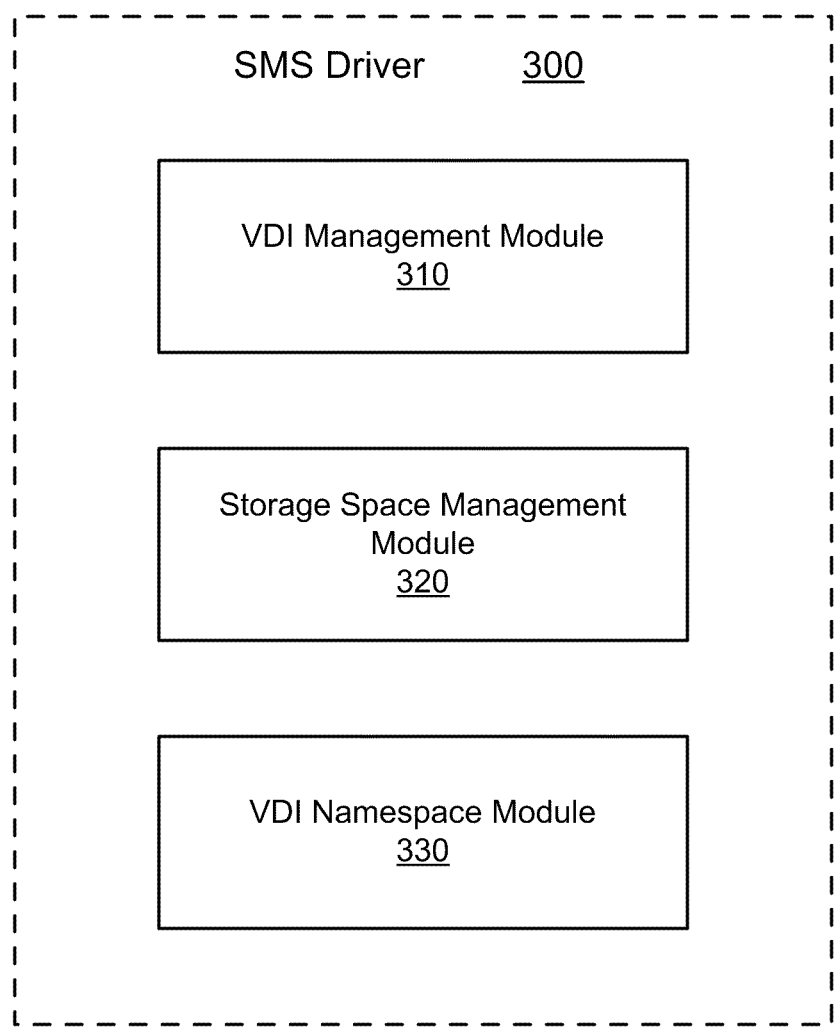
FIG. 3 is a block diagram illustrating modules of a storage management system driver according to one embodiment of the invention.

FIG. 3 is a block diagram illustrating modules of a storage management system driver 300 according to one embodiment of the invention. The SMS driver 300 translates/maps logical address space to physical address space for each I/O request. The SMS driver 300 comprises a VDI management module 310, a storage space management module 320 and a VDI namespace module 330. The VDI management module 310 is configured to manage live and snapshot VDIs, including creating empty VDIs and snapshot live VDIs and destroying VDIs based on I/O requests. The storage space management module 320 is configured to manage the physical address space in the SMS 200. The VDI namespace module 330 is configured to manage a vast number of VDIs for server virtualization in a human readable manner. The VDI management module 310 is further described in conjunction with descriptions of FIGS. 4-8. The storage space management module 320 is further described in conjunction with descriptions of FIGS. 9-11. The VDI namespace module 330 is further described in conjunction with descriptions of FIG. 14.

A SMS driver 300 addresses a data block in a physical storage volume by a unique address that is a combination of a SMS internal volume identification (ID) and an offset in the volume. The unique address of the data block is viewed by the SMS driver 300 as a low-level or physical address. Thus, the SMS driver 300 provides an abstraction of the physical volumes to a guest VM and the physical data block address space in the virtualization system becomes sparse. In one embodiment, the SMS driver 300 provides the abstraction of the physical volumes via virtual disk images through the VDI management module 310.

The VDI management module 310 is configured to create new empty VDIs and snapshot live VDIs. The VDI management module 310 is further configured to destroy live VDIs and snapshot VDIs, clone snapshot VDIs, allocate VDI identifications, send notification about VDI failure and I/O errors and collect statistic data about I/O requests and disk space allocation.

VDI Map and VDI Map Blocks

A virtual disk image (VDI) is an image of a block device as seen by a virtual machine at some moment in time of a computing process. A guest OS that runs in a virtual machine sees a VDI as a block device in its native environment. In a fully virtualized hardware model, the virtual machine allows running the guest OS without modifications. In the paravirtualized model, the virtual machine requires installing special device driver that is responsible for transferring I/O requests from a guest OS to a SMS driver 300 in an efficient manner. Specific details of this transfer depend on a particular virtualization platform and can be significantly different. However, a guest OS running in its native environment views a data block as a block device interface in SMS 200. This means that there can be multiple (up to few hundreds potentially) concurrent I/O requests in process between the guest OS and the corresponding VDI, just like in common SCSI layer on a traditional compute platform. One example of such an API is libaio where VDI is an implementation of libaio and the plumbing is a client.

A VDI can represent a live disk as being accessed and written into by one or more running virtual machines. A VDI can also represent a snapshot of a live disk at a historical point in time. A VDI representing a live disk is referred to as a live VDI and a VDI representing a snapshot of a live disk at a historical point in time is called a snapshot VDI. A snapshot VDI once created is unchangeable or read only. Thus, a snapshot VDI is also referred to as a frozen VDI. The term "snapshot VDI" and the term "frozen VDI" are used interchangeably from herein and the throughout the entire specification.

A VDI is logically a block device, potentially visible to a virtual machine. It has its own logical address space with data blocks numbered from 0 to n−1 (assuming total number of data blocks is n). These data blocks, however, are physically located on low-level storage volumes. Thus, a VDI address space represents a virtual disk address space mapping of an underlying physical address space accessed by a guest OS. The VDI management module 310 is responsible for directing I/O requests from a guest OS against the live VDI (virtual disk) address space into appropriate data blocks on the underlying physical volumes. The VDI management module 310 maintains VDI maps that map a logical address (i.e., a logical VDI address) for a data block as seen by a virtual machine to physical addresses for that data block on the underlying physical volumes. Maps are persisted on the underlying volumes as well. Each physical machine has maps for all VDIs that are active on this physical machine.

VDI map is a mechanism that translates a logical offset in a virtual disk, e.g., a VDI, into physical block addresses within a SMS 200 storage repository. A VDI block map contains one or more map blocks of a uniform size, such as 4 kilobytes (KB). One of the map blocks is a root block. VDI maps are extent based, where each map block contains a map block header and variable number of fixed size records (e.g., 128 bits). A record in a VDI map describes continuous extent (also called data extent) and contains an address of the beginning of the extent and its length. An extent is a contiguous area of logical VDI address space. An extent can also be contiguous in physical space (e.g., leaf nodes of the block map), or a concatenation of multiple data extents. In one embodiment, one record is for one data extent.

Figure 4:
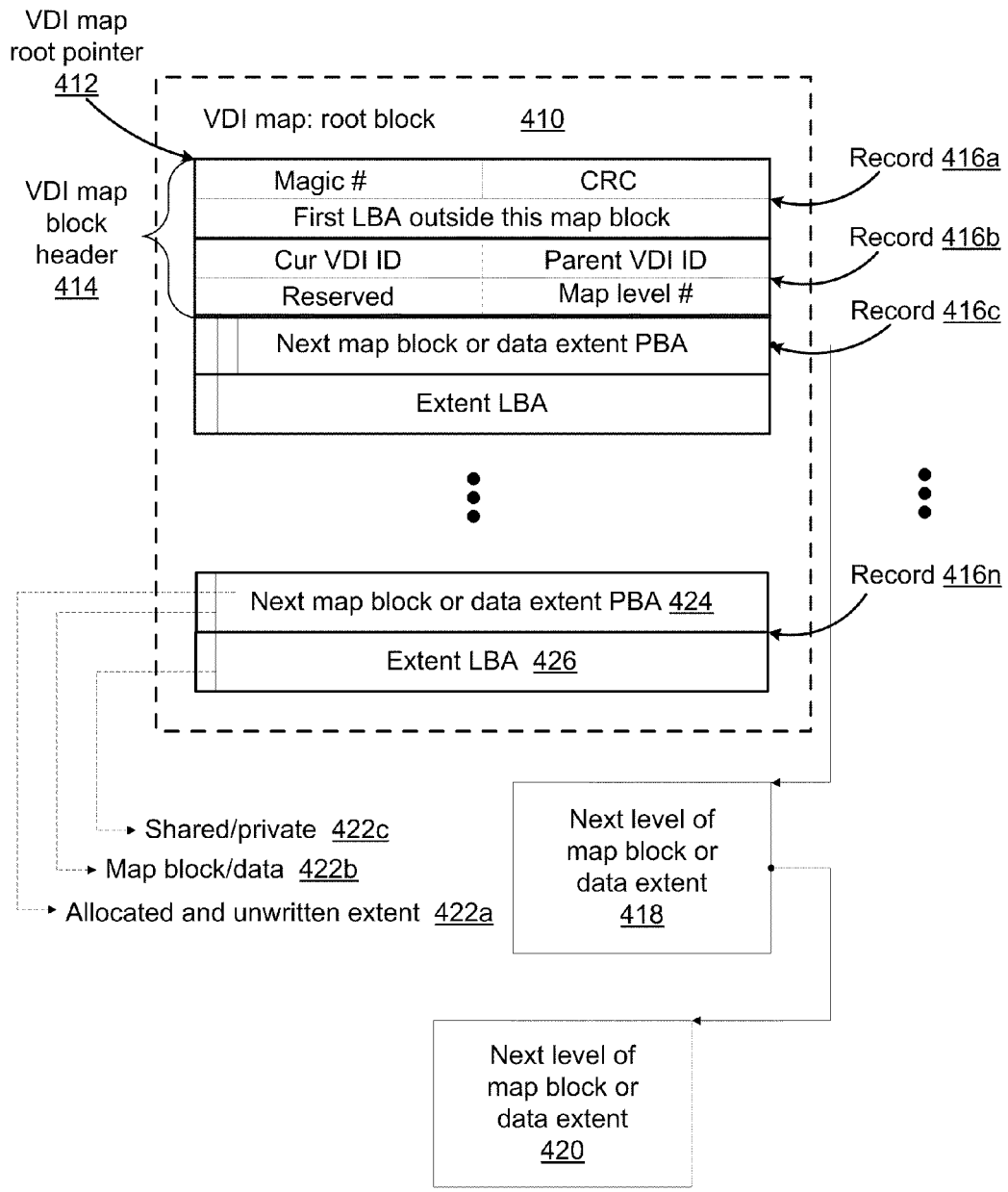
FIG. 4 is a diagram of an example of a root block of a virtual disk image map according to one embodiment of the invention.

Turning now to FIG. 4, FIG. 4 is a diagram of an example of a root block 410 of a virtual disk image map according to one embodiment of the invention. The root block 410 of the VDI map has a root pointer 412 pointing to the root block 410. The root block 410 contains a VDI map block header 414 and multiple records 416a-n. In one embodiment, the total number of the records for the root block 410 is 254 (e.g., record 0 to record 253). Each of the record 416 is associated with an extent (e.g., extent logical block address).

A map block header represents the signature of a map block. In one embodiment, a map block header includes logical block address (LBA) for the first block not covered by this map block. For the root block, it is the first logical address outside of the VDI map range. The map block header also includes the level of this block in a VDI map tree, a current VDI ID and a parent VDI (if any) ID, as well as cyclic redundancy check (CRC) code and a magic number. The magic number and CRC are used for sanity check in runtime and/or for consistency check/repair by utilities external to the SMS 200. Level of a map block in the VDI map tree helps with traversal of the VDI map tree.

Taking the root block 410 of the VDI map illustrated in FIG. 4 as an example, the VDI map block header 410 comprises two records: record 416a and record 416b. The record 416a contains a magic number (e.g., magic #), a CRC code, and the first LBA outside the root block. The record 416b contains a current VDI ID, a parent VDI ID, a reserved field and map level information.

A VDI map is organized in a tree structure, called VDI map tree. There is a single map block at the root of the VDI map tree and it is called root block. Depending on how many extents are there in a VDI map, a VDI map tree can include one or more leaf records in it, or references to other map blocks in the map tree. A VDI map tree can contain several levels of map blocks. There are two kinds of the records in a VDI map—leaf records and map records. A leaf record refers to real data extent in the VDI map, and describes not only logically contiguous but also physically contiguous data extent. A map record refers to another map block rather than real data extent in the VDI map.

Taking the root block 410 of the VDI map illustrated in FIG. 4 as an example, the root block 410 comprises multiple records 416a-n. Record 416c is a map record that refers to a map block/data extent 418 at next map level, which in turn refers to a map block/data extent 420 at next map level.

There are three kinds of leaf records: unallocated, allocated/unwritten, and regular (allocated and written) extent. An unallocated leaf record refers to an extent that does not exist yet in a data storage device. An unallocated leaf record reads zeros on a read request and needs a new allocation on a write request. An allocated/unwritten leaf record refers to an extent that has existed in a data storage device. An allocated/unwritten leaf record reads zeros on a read request. A written request for an allocated/unwritten leaf record can go directly through. An allocated and written leaf record refers to an extent that has existed in a data storage device and has data written in the extent.

Each record contains a logical block address (LBA), a physical block address (PBA) of next level map block or data extent and one or flags indicating record type. Addresses are in 512 bytes units or disk sectors. Records are sorted in the order of logical addresses and represent one contiguous extent in the VDI address space.

Taking the root block 410 of the VDI map illustrated in FIG. 4 as an example, the record 416n has the PBA 424 of next map block or data extent, the extent LBA 426 and three flags 422a-c to describe the record type of record 416. The three flags to describe the record type of record 416 are an allocated and unwritten extent flag 422a, a map block/data flag 422b and a shared/private flag 422c. A flag can take a value of 0 or 1. An allocated and unwritten extent flag of a record set to 1 means that the record is allocated and unwritten. An allocated and unwritten extent flag of a record set to 0 means that the record is allocated and written. An unallocated extent (i.e., a "hole") is indicated by a PBA 424 having a value of −1 (i.e., negative 1). For an unallocated extent, the allocated and unwritten extent flag value is not used in describing the record type. A map block/data flag of a record set to 1 indicates that the record is a leaf record that refers to real data extent in the VDI map. A map block/data of a record set to 0 means that the record is a map record that refers to another map block, rather than a real data extent in the VDI map. A shared/private flag of a record set to 1 indicates that the underlying physical storage described by this record is writable and shared by other VDIs. Shared/private flag 422c can be used for implementing VDI snapshot described later in the specification.

VDI map is a powerful mechanism that allows for very flexible data allocation and placement in the storage management system. It interacts very efficiently with the parent/child VDI concept. It also supports data placement in various storage areas like log and live space. To write new data into a child VDI or sparsely allocated VDI can be efficiently done by allocating a new map block in a convenient place, and the active VDI map is updated to reflect new data placement.

Figure 5A:
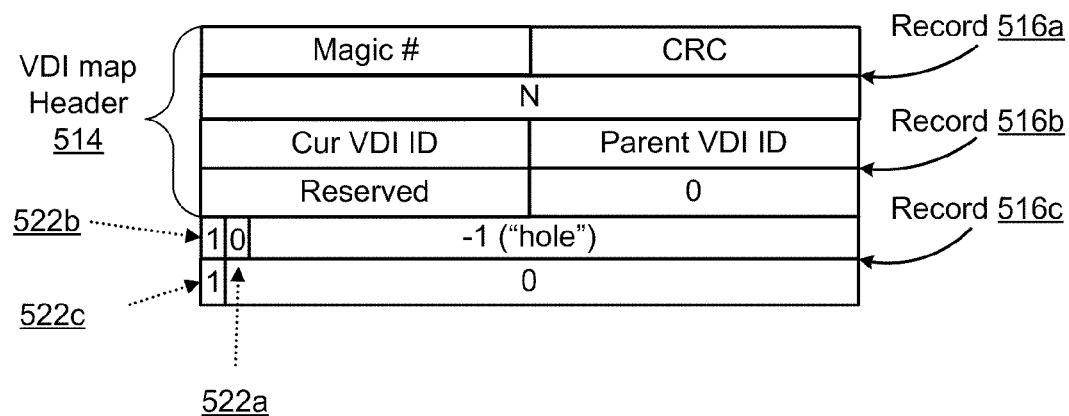
FIG. 5A is a diagram of a virtual disk image map after initialization according to one embodiment of the invention.
Figure 5B:
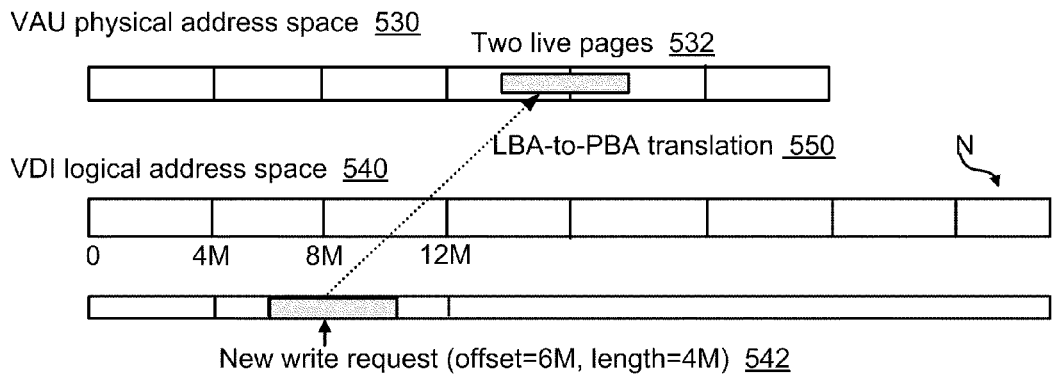
FIG. 5B is a diagram of an example of a write request in physical address space and logical address space associated with the virtual disk image map illustrated in FIG. 5A.
Figure 5C:
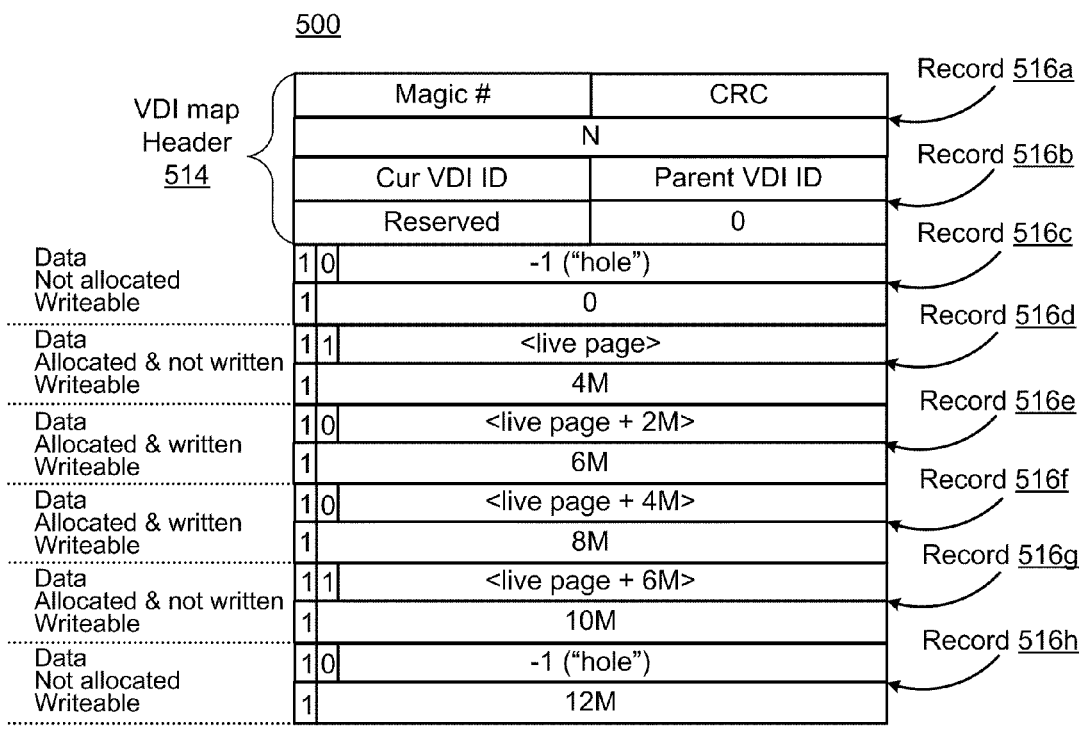
FIG. 5C is a diagram of the virtual disk image map after performing the exemplary writes illustrated in FIG. 5B.

The method for modifying a VDI map during a write operation is described with reference to FIGS. 5A, 5B and 5C. The following FIGS. 5A, 5B and 5C illustrate the VDI map at different points during a write operation. FIG. 5A is a diagram of a VDI map 500 after initialization according to one embodiment of the invention. The VDI block map 500 is newly created during initialization and does not contain any valid data. The VDI block map 500 has size N and contains three records 516a-c. The content of the VDI is one unallocated extent described by record 516c. Specifically, the unallocated extent (i.e., a "hole") is indicated by a PBA having a value of −1 and the extent LBA is 0. The flags 522a-c of the record 516c describe the record type of record 516c. Since the extent is an unallocated extent, the allocated and unwritten extent flag 522a is not considered to describe the record type of record 516c. The map block/data flag 522b set to 1 indicates that record 516c refers to a data extent. The shared/private flag 522c indicates that the underlying physical storage described by record 516c is writable and shared by other VDIs.

FIG. 5B is a diagram of an example of a write request 542 in logical address space 540 associated with the VDI map 500 illustrated in FIG. 5A to be translated to the physical address space 530. The new write request 542 has a length of 4 megabytes (4M) with an offset at 6M. The logical address space 540 of size N is divided into 4M allocation units, also called pages. The pages in the logical address space 540 dispense 4M pages on 4M page boundaries. Similarly, the physical address space 530 is divided into multiple physical allocation units, called VAU. The new write request 542 with the offset of 6M comes across two 4M pages, first partially at 4M-8M page boundary and second at 8M-12M page boundary. The write request 542 requires two unwritten extents as two live pages 532 into the VAU physical address space 530. The logical address space to physical address space translation is represented by the arrow 550 and will be further described in the following sections of the specification.

As writes continue, more and more records get added into the VDI map 500 illustrated in FIG. 5A. FIG. 5C is a diagram of the VDI map 500 after performing the exemplary writes illustrated in FIG. 5B. The VDI map 500 contains 8 records 516a-h. The first two records 516a-b contains the VDI map header 514. Record 516c is the first record after the VDI map header 514. Record 516c records an unallocated data extent (i.e., −1 for PBA) and data extent of 0 (i.e., 0 for extent LBA). The record type flags of record 516c indicate that it is a data record, not allocated extent and writable. Next record 516d indicates a live page with a LBA at offset 4M. Record 516d is a data record, allocated and not written extent and writable. Record 516e corresponds to the write at 4M-8M boundary illustrated in FIG. 5C. The PBA of record 516e is at 2M beyond the live page indicated by record 516d. The LBA of record 516e is at 6M offset. Record 516e is a data record, an allocated and written extent and writable. Record 516f corresponds to the write at the 8M boundary illustrated in FIG. 5C. The PBA of record 516f is at 4M beyond the live page indicated by record 516d. The LBA of record 516f is at 8M offset. Record 516f is a data record, an allocated and written extent and writable. Record 516g corresponds to the write at 8M-12M boundary illustrated in FIG. 5C. The PBA of record 516g is at 6M beyond the live page indicated by record 516d. The LBA of record 516g is at 10M offset. Record 516g is a data record, an allocated and not written extent and writable. Last record 516h records a data extent, not allocated (i.e., −1 for PBA), writable at offset of 12M.

Depending on the particular write configuration, records get added into a VDI map 500 as necessary. In the embodiment illustrated in FIG. 5A-C, the size of the map block is fixed and is 4 KB in size. In the worst possible case of fragmentation, each 4 KB page of data in a map block requires its own leaf record. Each first level map block covers 256*4 KB=1 MB of data, or 2^8 pages. Assuming 4 levels in a VDI map tree, the maximum is (2^8)^4=2^32 pages or 16 TB maximum in a physical volume. Responsive to a map block being full, the VDI management module 310 allocates another 4K map block, moves the second half of the records from the full block into newly allocated one and initializes the header of the newly allocated map block accordingly. Resulting from allocating the map block are two map blocks covering the same LBA range as the original full map block, the original block covering the head of the LBA range and the second covering the tail of the LBA range.

Figure 6A:
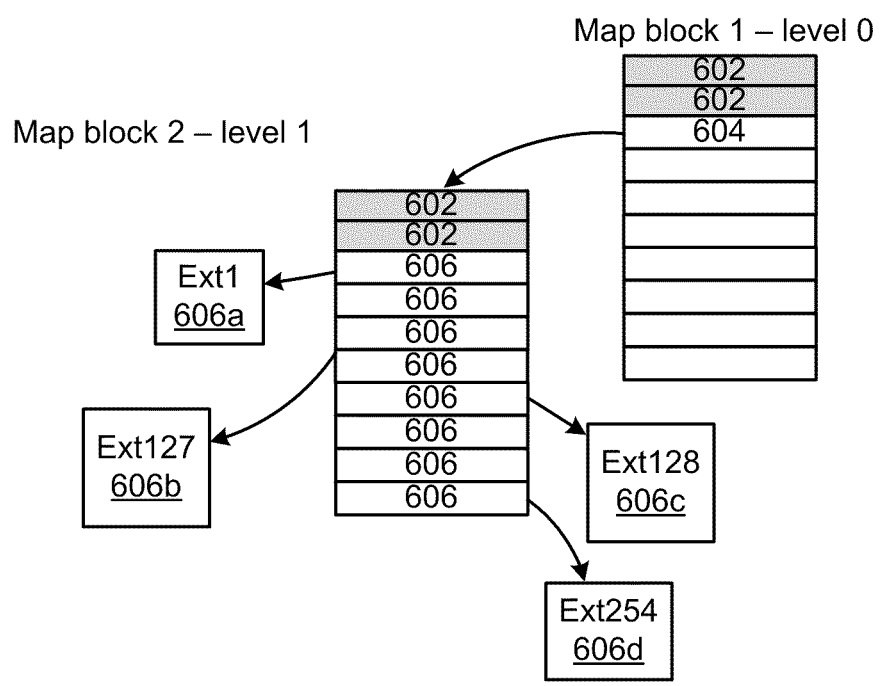
FIG. 6A is an example of a block diagram before writing into a full virtual disk image block according to one embodiment of the invention.

FIG. 6A is an example of a block diagram before writing into a full VDI map block according to one embodiment of the invention. Map block 1 is at level 0 and contains two map block headers 602. Map block 1 at level 0 also contains a pointer 604 at another map block, such as map block 2 at level 1. Map block 2 at level 1 includes multiple data extents, such as extent 1 (606a), extent 127 (606b), extent 128 (606c) and extent 254 (606d). Currently map block 2 is full and a new write into map block 2 requires a new allocation of another map block.

Figure 6B:
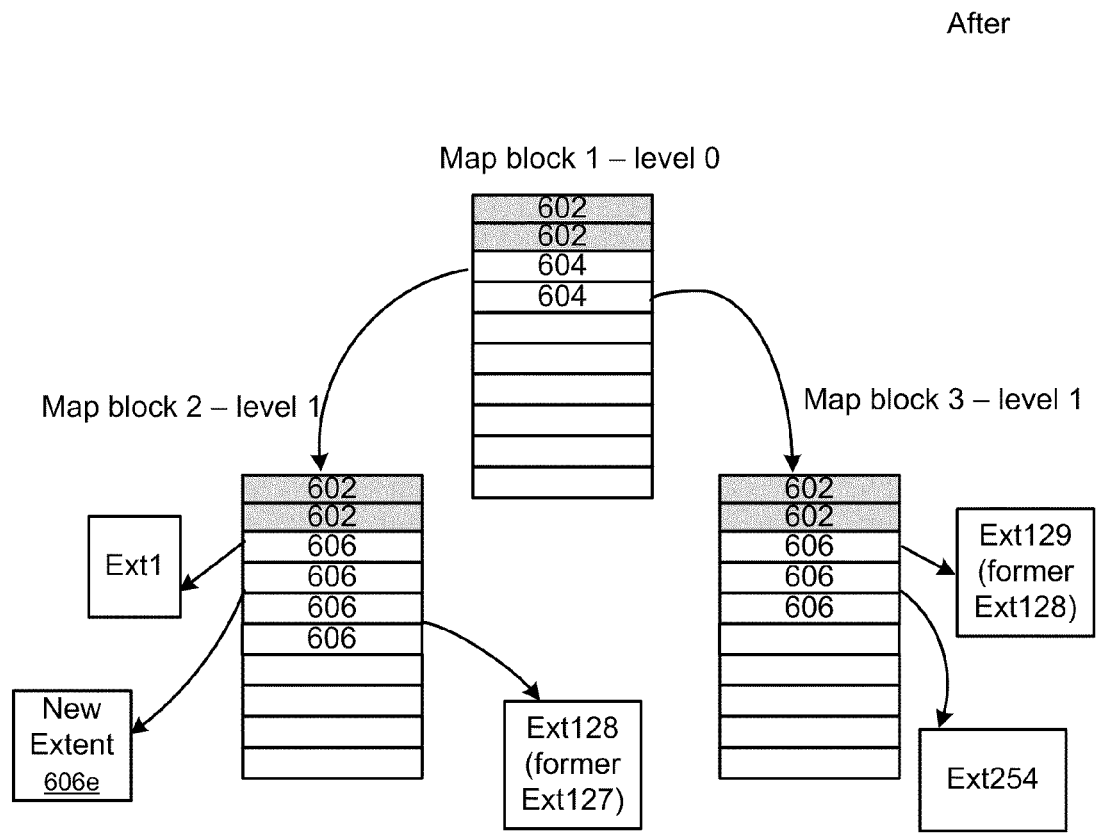
FIG. 6B is an example of a block diagram after writing into a full virtual disk image block illustrated in FIG. 6A according to one embodiment of the invention.

FIG. 6B is an example of a block diagram after writing into a full VDI map block illustrated in FIG. 6A according to one embodiment of the invention. The VDI management module 310 is responsible for reflecting the new map block at the previous level (i.e., level 0). Specifically, the VDI management module 310 inserts a map block record into the map block 2 at level 1 which is currently full. The VDI management module 310 allocates a new map block at the same level as map block 2, such as the map block 3 at level 1, and distributes some of the map records of the map block 2 at level 1 to the newly allocated map block 3 at level 1. For example, a new extent 606e is inserted into the map block 2 as a leaf record at map block 2 at level 1. The space originally allocated for extent 127 is now occupied by extent 128 and the space originally allocated for extent 128 at map block 2 at level 1 now is for extent 129 in the new map block 3 at level 1. Similarly, the space originally allocated for extent 254 at map block 2 now is allocated in the new map block 3 at level 1. The VDI management module 310 updates the map block 1 at level 0 for the new allocation of the map block 3 at level 1 by inserting a pointer to the new map block 3 at level 1 in the map block 1 at level 0. In case of a map block at an upper level is full, the map block at the upper level is split similarly into to two map blocks at the same level.

VDI Creation and Destruction

In order to gain access to the point in time a snapshot VDI represented, a VDI needs to be cloned. A cloning operation applies to a snapshot/frozen VDI and creates a live VDI that point to the same data blocks as the snapshot. The newly created live VDI is called child, and the original one is parent. A parent VDI is also called a "golden" image. A child VDI represents the most current or latest state of the disk as seen by a virtual machine using it, while a parent VDI represents some historical state that was there some times ago. Writes to the child will not modify the parent's content or its map, but instead are routed to newly allocated data blocks and child's map is changed accordingly. The VDI management module 310 keeps a VDI map for each snapshot VDI in addition to the VDI maps for live VDIs. A snapshot VDI map reflects the mappings to the data blocks at the time of the snapshot.

There are two kinds of new VDIs—thinly provisioned and fully allocated. A thinly provisioned VDI has no disk space allocated to it except its map root block, while a fully allocated VDI has disk space allocated for its size and marked as unwritten. A VDI created from scratch is like a brand new disk—it contains no usable data. In SMS 200, a newly created VDI reads all zeroes.

Creating a derived VDI from an existing VDI is like copying of an existing disk—the new disk of the same size has exact copy of the data from the old one. There are two operations to create derived VDIs—snapshot and cloning. Snapshot operation produces an unchangeable copy from a live disk, while cloning produces a live disk from an unchangeable copy. Specifically, snapshot is an operation that applies to a live VDI and produces a snapshot VDI. A snapshot VDI represents an image of a VDI at the moment of the snapshot. As described in VDI definition section above, the snapshot VDI becomes a parent VDI, and the live VDI becomes a child VDI. Live VDI continues "to live" and be available for one or virtual machines. If any virtual machine is using this live VDI (i.e., corresponding virtual disk), the virtual machine does not even notice that the live VDI has been snapshot.

Creating snapshot VDIs is a simple operation in SMS 200. In order to maintain parent/child relationships among multiple VDIs and track common blocks shared by multiple VDIs, VDI management module 310 creates one or more copies of the VDI map.

Parent VDIs are unchangeable: neither the VDI map nor the underlying data of a parent VDI can change. The VDI management module 310 does not allow any operation on a parent VDI. However children of a parent VDI are live VDIs. In order to support snapshot operations, VDI map mechanism has a way to distinguish among maps of a parent VDI and its children. In one embodiment, the VDI management module 310 creates snapshot VDIs using the shared flag of a VDI map block.

TABLE I below illustrates combinations of the shared flag and allocated and unwritten flag of a VDI map block. "-" symbol means that the corresponding flag is not set (i.e., having a value of 0) and "x" symbol means that the corresponding flag is set (i.e., having a value of 1). "S" represents the shared flag of a VDI map block and "AW" for the allocated and unwritten flag of the VDI map block.

TABLE I

| Shared Flag and Allocated and Written Flag | | |
|---|---|---|
| S | AW | Meaning |
| — | — | Normal data extent |
| x | — | Shared map entry; immutable: new allocation is necessary to accommodate new data |
| — | x | Allocated and not written; writes are allowed to go through, but reads return zeros |
| x | x | Shared, allocated and unwritten; reads go to parent's data blocks; writes do not make new allocation and uses the allocated and unwritten space; shared flag is cleared after writes |

Specifically, if the shared flag is set, it means that the underlying physical storage that this record describes is shared with other VDIs and cannot be changed. If a child live VDI encounters a write into such a region, it behaves similarly to an unallocated region—new storage gets allocated to accommodate the write request and child's VDI map gets updated to reflect this allocation. Because this new allocation is not shared with any other VDI, it is marked as private so that further write operations into that range go as normal.

The new allocation can be larger than a particular write operation. In this case child's VDI map has allocated/unwritten extent. This extent, even though it is private to the child, is still marked as shared as well as allocated and unwritten. This is done so that a read from that region goes to the parent's data blocks. However write into this region does not make new allocation, and writes uses the allocated/unwritten space. The shared flag is cleared after writes.

Using shared flag to help create snapshot VDIs allows for VDI map copy optimization. As the shared flag applies to the whole region in a VDI logical address space, there is no need to copy the whole VDI map. Instead, only the root map block of the VDI map is copied, and all the records in the root map block are marked shared. The rest of the map is shared between the two maps. As a disk lookup process traverses the VDI map tree, the first encountered shared flag triggers shared region functionality and it applies to all of the extents underneath. When the lower level map blocks are split or updated, shared flag gets propagated accordingly, reflecting what parts of the VDI map and data are still shared.

Using the shared flag in a VDI map as described above, the root map block of a live VDI gets copied and the original root map block gets all records in it marked as shared. The live VDI becomes a child of the original VDI in this operation. Live child VDI is released right after copying and is ready to be used by virtual machines. The VDI management module 310 waits for all I/O that have been started at the moment of creating snapshot to complete. After that, a snapshot VDI is created.

Turning now to cloning operation, a cloning operation applies to a snapshot VDI and produces a new live VDI that is a child of the snapshot VDI. The child VDI shares data with the parent as long as the data is not changed by writing into the child address space. In one embodiment, the VDI management module 310 creates new VDIs using the shared flag of a VDI map block. Comparing with snapshot operation described above, the VDI management module 310 sets the shared flag of a VDI map in a copy of the root map block as if the copy of the root map block belongs to the newly created child VDI.

A single frozen VDI can be cloned multiple times and the frozen VDI becomes a parent VDI of one or more children VDIs through cloning operation. Initially the children have the exactly same data as the parent VDI. Changes made to children VDIs by one or more writes from a virtual machine make the children VDIs more and more different from their parent VDI with time depending on the pattern of writes.

For example, the SMS 200 starts multiple virtual machines from the same carefully created and preconfigured disk image—called golden image. The golden image is cloned to start a number of live VDIs, which are children of the golden image. The newly created live VDIs have a lot of data blocks that are common among all of them and the golden image itself.

A golden image can be carefully created by running a virtual machine that is dedicated to golden image creation. A golden image accommodates common applications, system and application patches, etc. When a new golden image is ready, a system administrator of the SMS 200 creates a snapshot VDI, i.e., a new golden image. A dedicated virtual machine, i.e., a golden image creator, can continue using the same live VDI as it is one of the ancestors. This can be done for final testing of the golden image, or to start creating the next golden image. The administrator can stop all virtual machines that use a previous golden image at some time, optionally destroy its children VDIs, and restart the children VDIs from the new golden image though cloning.

In one embodiment, cloning is not an automatic operation, and it's an administrative action performed by human. Some rather infrequent cloning operations can be started automatically. For example, a snapshot VDI can be cloned in order to start backup job. Live VDIs can be created en masse by a virtual machine management application to start a large number of virtual machines from the same golden image.

Live VDIs can be accessed by a virtual machine running on any physical machine in a SMS cluster. Access to the same live VDI (shared) from multiple physical hosts is not allowed. If read only access to the same disk image is required by a VDI, the VDI has to be frozen and the newly created frozen VDI later can be cloned. Newly created live VDI has the same content as its parent VDI at creation and it can be made accessible in a read only fashion. Each VDI has a unique system wide VDI ID that is used to address data blocks on that VDI. VDI ID can be used to obtain pointer to a persistent VDI map that fully describes VDI metadata.

To efficiently represent a parent/child relationship among multiple VDIs, the VDI management module 310 represents a VDI map as a VDI map tree. Maintaining parent/child relationships among multiple VDIs allows for common block tracking and associated storage savings by the VDI management module 310 because the VDI management module 310 allows the SMS 200 to only store data blocks that are changed between a child and a parent. VDI map also simplifies disk image management as the VDI map makes it possible to present the map tree to the administrator for tracing ancestry of each VDI. The parent/child relationship captured by a VDI map also reflects common block sharing—the older a VDI is on the map tree, the more common data it represents.

Figure 7:
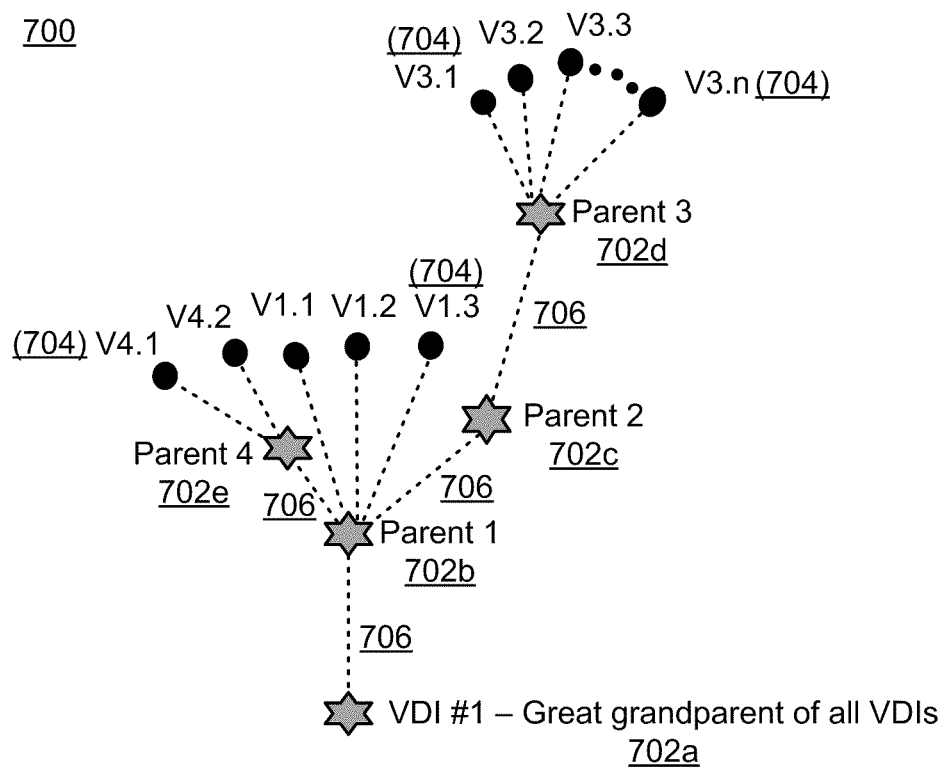
FIG. 7 is a diagram of a virtual disk image map tree illustrating a parent-child relationship among multiple live and frozen virtual disk images according to one embodiment of the invention.

A VDI map tree can be represented as directed graph. Parents are represented as nodes, and edges represent relationships between a parent and one or more children. All VDIs have a common great grandparent VDI. The common great grandparent is a thin provisioned, empty frozen VDI. FIG. 7 is a diagram of a VDI map tree 700 illustrating a parent-child relationship among multiple live and frozen VDIs according to one embodiment of the invention. VDI #1 (702*a*) is the common great grandparent of all the VDIs in the VDI map tree 700. It is an empty frozen VDI. Patent 1 (702*b*) was created as an empty VDI by cloning its parent, i.e., the VDI #1. Parent 1 as a result of cloning becomes a live VDI and its parent VDI #1 becomes a frozen VDI. Patent 1 was loaded with data, for example, as a result of guest OS installation, and later Parent 1 was frozen as a snapshot VDI representing a snapshot of a live disk at a historical point in time. SMS 200 treats a snapshot VDI as new one. Live VDI that was used to create a snapshot VDI continues its life with the same identity. In other words, a virtual machine which is the owner of the VDI map tree 700 continues using Parent 1 while the virtual machine can continue creating one or more live VDIs.

Parent 1 (a snapshot VDI) was cloned several times. For example, Parent 1 was cloned to create three live VDIs, V1.1, V1.2 and V1.3. The three live VDIs (i.e., V1.1, V1.2 an V1.3) are served as virtual disks for a guest machines. The 4$^{th}$ cloned live VDI from Parent 1 later became a snapshot VDI, Parent 4 (702*e*). Parent 4 was cloned twice to create live VDIs, V4.1 and V4.2. Turning now to the 5$^{th}$ child of Parent 1: this live VDI gave life to Parent 2 (702*c*) which later becomes Parent 3 (702*d*), that is a golden image for multiple live VDIs, V3.1, V3.2, V3.3, up to V3.n, where n is a predetermined a threshold. The live VDIs, V3.1-V3.n, can be connected to different virtual machines that run on different physical machines.

There are two kinds of snapshots—light and heavy. Children of a lightweight snapshot VDI have higher fragmentation and, as a result, worse performance characteristics. A heavyweight snapshot generally takes more time to create, but a heavyweight snapshot eliminates extra data fragmentation for its children. Taking FIG. 7 as an example, Parent 4 is a lightweight snapshot. Parent 3 can be created as a heavyweight snapshot. As a child of lightweight snapshot Parent 4, the data of VDI 4.1 is also present at its parent (i.e., Parent 4) disk space, and its grand parent (i.e., Parent 1) disk space. As children of heavyweight snapshot Parent 3, the data of live VDIs V3.1-V3.n are only shared with their immediate parent, Parent 3, despite of their grandparents Parent 2 and Parent 1.

Some VDIs become useless after a while. The VDI management module 310 provides for a mechanism to get rid of useless VDIs and reclaim the space. In one embodiment, the VDI management module 310 destroys useless VDIs explicitly according to an administrative request. However, some computer applications like disk backup create transient snapshot VDIs that need to be destroyed when the disk backup job is done. In order to perform disk backup, a snapshot of a live VDI is created. The snapshot of the live VDI is then cloned to create a new live VDI, and the newly created live VDI is used as the source of backup data. Depending on a particular embodiment of implementation, the new live VDI can be read only, or even writable to support functionality such as application log replay. When backup operation is done, the new live VDI used for backup and its parent are not needed any more and are destroyed automatically as a part of post-backup procedure by the VDI management module 310.

Any live VDIs can be destroyed if it is not active. This is a relatively light weight operation because the VDI management module 310 only needs to de-allocate any allocated non-shared data and the map blocks associated with the destroyed live VDIs. A snapshot VDI cannot be destroyed quite that easily because it shares data with its children. Children have accumulated changes but refer to the snapshot for the common blocks. This means that destroying snapshots is generally performed if there are no children. In case of a snapshot VDI not having any children, destroying the snapshot VDI follows the same destruction procedure of a live VDI.

Figure 8:
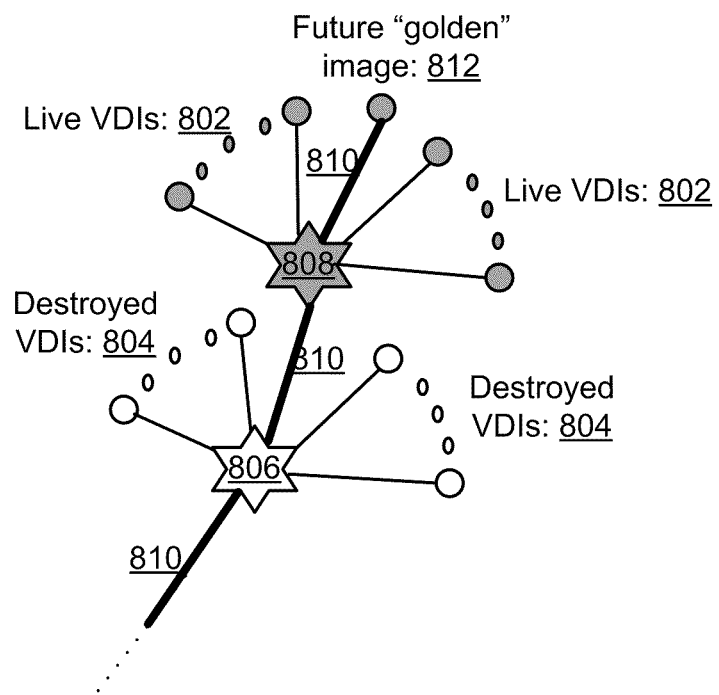
FIG. 8 is a diagram of an example of a virtual disk image map having multiple virtual disk images during virtual disk image creation, snapshot and cloning operations according to one embodiment of the invention.

Turning now to FIG. 8, an example of a VDI map having multiple VDIs during VDI creation, snapshot and cloning operations according to one embodiment of the invention is shown. The VDI map 800 have multiple golden images, old golden image 806, current golden image 808 and a future golden image 812. The thick black line 810 illustrates a trace of golden image VDIs during VDI creation, snapshot and cloning operations over a period of time. The dashed line prior to the old golden image 806 indicates additional operations by VDI management module 310 which are not shown in FIG. 8. Responsive to a VDI being useless, the VDI management module 310 destroy the VDI. As illustrated in FIG. 8, multiple children VDIs 804 of the old gold image 806 are destroyed after being used. The children VDIs 802 of the current gold image 808 represent live VDIs, and one of them (e.g., VDI 812) becomes the future gold image which is to be cloned for future operations upon requests from virtual machines.

VDI Metadata and Management

A SMS 200 instance on every physical machine maintains certain amount of information in memory (e.g., a cache memory) to manage VDIs that are open on this physical machine. This information in the SMS 200 is called VDI metadata. The memory to store VDI metadata is called map block cache. Main part of this information is map blocks that describe active areas in the VDIs. VDI metadata cache is not required for SMS 200 functionality, but it is used in one embodiment for many performance optimizations, such as write transaction optimization. VDI metadata cache also makes VDI maps interpretation fast.

Map blocks in memory are exact replicas of on-disk map blocks. As on-disk map blocks refer to each other by physical address, the same logic applies in memory. In other words, a tree traversal from a map block to the next is done by physical address. In one embodiment, map block cache is managed as a hash table with hash function based on the physical address of the map block on a physical storage. Map blocks are referred to by their physical address. Map blocks are accessed in a manner similar to traditional inode cache in an O/S. The function returns the pointer to the block header in memory, either after it is found in memory or a new block is allocated and read in from the newly allocated block.

Each map block in memory has a separate structure associated with it that is used to maintain the cache. The structure is referred to as map block header. Map block header has a block physical address field, a flag/state field, pointers for hash chain list and a free/dirty list, a reference count, a lock (e.g., a mutex scheme) protecting the structure, and a pointer to the 4K map block itself.

There are two linked lists a map block can be on—a free/dirty list, and a hash list. All map blocks are linked via free/dirty list pointers and either on the free list or the dirty list depending on the block's state. A map block on the free list is either an uninitialized map block or a clean map block. A map block on the dirty list is a dirty map block with data that needs to be written back to storage. A hash list is used to find a map block in memory. First, a hash function identifies the hash chain, which is scanned linearly to find the block by the physical address of the block. Uninitialized blocks are not on the hash chain.

In one embodiment, a map block and its header can be in the following states:

Uninitialized: the map block does not have usable data; it is ready to be allocated for use; it is on the free list.

Clean: the map block contains exact replica of the on-disk map data; it is ready for use; it is also ready to be reused. Map blocks like this are on the hash list as well as on the free list. They are being moved to the tail of the free list as they are used, and the free list is maintained in a least-recent-used (LRU) order.

Dirty: the map block contains newer map information than that on the storage; it is ready for use, but it cannot be reused as it needs to be written back to the storage. Map blocks like this are on the hash list. They are also linked to the dirty list of map blocks. The dirty list of map blocks allows the SMS 200 to locate all dirty map blocks in cache.

There are multiple dirty lists of map blocks. For example, there are two dirty lists for periodic snapshots maintenance, and another one for user initiated per VDI snapshot. Each dirty map block is on one of these dirty lists. Dirty map blocks do not get flushed in any automatic fashion. In one embodiment, a user of a map block cache has to call functions, such as vs_map_flush (dirty_list) function, to initiate map blocks writes. After writes are complete, the map blocks become clean and available for reuse.

TABLE II illustrates an embodiment of multiple map block cache Application Programming Interfaces (APIs). Those skilled in the art will recognize that TABLE II represents only one example of a set of APIs, and a variety of other sets of APIs with the same or different functions can be used to implement the map block cache.

TABLE II

Map Block Cache APIs

| API | Meaning |
|---|---|
| vs_map_get(pba) | Given physical address of a map block, first look up in the memory cache for the given PBA. If the block is not in the cache, get a free block from a free list or allocate a new one as appropriate and read the block from the new allocation. Increment reference count and return blocks address. |
| vs_map_alloc(pba) | Get a free block from free list or allocate a new one as appropriate, initialize it, increment reference count, mark it dirty, and return it. No I/O is necessary. As an additional check, look up the "pba" to make sure it is not in the cache. |

TABLE II-continued

Map Block Cache APIs

| API | Meaning |
|---|---|
| vs_map_put(block) | Decrement reference count. If reference count drops to zero and the map block is not dirty, put it on the free list. |
| vs_map_dirty(list) | Marks given list of map blocks dirty. Removes the blocks from the free list which makes them unavailable for reallocation. |
| vs_map_flush(list) | Initiate I/O operation to put the block on the list on the storage as appropriate, and return to the caller. When I/O is done, mark the block as clean |
| vs_map_init_pool(buf) | Initialize temporary map cache from an array of map blocks. This is used for instance in flushers to read in log mark and traverse submaps that are recorded in it. It is assumed that the traverse never reaches outside of the set of map blocks in the log mark. Map blocks in such a pool never become dirty and never need to be reallocated and/or flushed. |
| vs_map_get_pool( ) | This function is similar to vs_map_get( ) function but retrieves map blocks from temporary submap pool initialized by vs_map_init_pool( ). It is intended for submap traversal in the assumption that all of the submap resides in the buffer provided to vs_map_init_pool( ) so no I/O is ever performed. |

Map block cache is based on 4K pages that are same as the map block size. The map block cache may grow and shrink according to predetermined cache-min and cache-max parameters. Initially metadata cache has a cache-min size. Cache-max value depends on total amount of physical memory available in Dom0 (e.g., Service Domain or Console OS). In one embodiment, heuristics are used to decide when to allocate memory for map block cache.

Physical Disk Space Allocation

A disk space in a SMS 200 represents the underling physical address space in the SMS 200. The storage space management module 320 is configured to manage the disk space in the SMS 200. The term "disk space" and term "physical address space" are used interchangeably from herein and throughout the entire specification. The storage space management module 320 addresses data blocks in the SMS 200 by a unique address that is a combination of a SMS internal volume ID and an offset in the volume. The SMS 200 treats this unique address as a "low-level" or physical address. In one embodiment, a physical address of 62 bits is divided into an offset of 46 bits and a volume ID of 16 bits in 512-byte sections of a volume. This allows 64K volumes of a very large physical address space size, and thus, a sparse physical address space.

The disk space management module 320 divides a disk space into three major categories: log space, live space and an optional history space. Log space is allocated per physical machine or SMS instance. Log space has a log (also called data log) associated with it. The main reason for log space is to mitigate transactional nature of writes imposed by complex block maps in SMS 200. Log space also helps to optimize disk heads contention between virtual machines running on different physical machines, and perform additional optimization based on write cancellation and aggregation. In addition, log space segregates reads from writes. For performance optimization log space may be allocated on dedicated spindles so that a SMS instance is solely responsible for disk heads scheduling on the SMS instance. Log space also helps to maintain VDI snapshots in the SMS 200.

Live space, also called production space, represents the current data as seen by virtual machines. Except for relatively small amount of transient data located in the log space, all live VDIs data is located in the live space. It means that majority of read operations from virtual machines is satisfied from live space.

In order to preserve sequential read throughput from live VDIs, live space is allocated in large extents or pages (e.g., 4 MB). Live space contains both parents' VDI data and data written in live VDIs. Live VDIs (leaves in the VDI map tree) may contain sparsely written large extends or pages. Data for these VDIs is obtained by reading both from parent VDI large extent and the active VDI large extent as appropriate in an interspersed manner.

As live VDI is getting one or more snapshoot, the multiple snapshots links in a chain. A single read operation from a virtual machine becomes multiple reads across multiple number of disk locations associated with the multiple snapshots in order to assemble the pieces across the multiple snapshots. While potentially acceptable for historical snapshots, multiple snapshots of a live VDI may not be appropriate for live space. An active live VDI data is always in both live space and log space. For example, live space contains the data from the latest flushed periodic snapshot of a live VDI, while the most recent data written since then resides in the log space.

In order to support cloning of already cloned children without significant performance penalty, live space has a notion of heavyweight snapshots. If an active VDI needs to be cloned and become a base for other live VDIs, the sparse large extents need to be eliminated by copying missing data into the unwritten holes. In other words, the snapshot needs to become a heavyweight snapshot. Depending on the particular embodiment, this copying may need to be done with or without active access to children VDIs.

Optional history space contains historical data of VDIs. History space contains the data written in the SMS 200 (ignoring very transient data blocks that were written and rewritten within very short period of time, basically between snapshots). If history space is enabled, the SMS 200 offers inherent disk to disk backup capability and fast disk failure recovery for server virtualization.

Optional history space gets its content from the log of the log space. As the data is digested and placed into history space, the storage space management module 320 creates automatic periodic snapshot in history space for each VDI. Frequency of these snapshots is configurable and does not depend on the behavior of live space. As log data is getting flushed from the log space into the live space, the old data for the same logical location can be also obtained from the log space and gets flushed into the history space.

Optional history space performance requirements are less stringent than that of live space allocation. Reads and writes in the history space does not have to occur in large extends (as live space) and can be done in natural I/O sizes. This means that reading from older snapshots may require multitude of disk seeks and hence be slow. Space allocation in history space is similar to live space. In one embodiment, it is based on fixed size 4M pages.

A data write in the SMS 200 is first written into log space for minimizing disk heads contention. Additionally, data writes into log space first also allows mitigation of transactional writes, write cancellation and aggregation, and separation of writes from majority of reads. Multiple writes to log space are strictly sequential because physical disks have much better data throughput in sequential access than other means of multiple writes. Sequential writes to log space is maintained by the storage space management module 320 by allocating log space on a per physical machine basis and the physical machine contains dedicated disk spindles for the log space allocation.

Log (i.e., log space data log) in log space is flushed periodically into various destinations depending on configuration of SMS 200. In one embodiment, history space is not enabled, and log space data gets flushed into live space. Log space wraps around after flushing the data to make space for new writes. In another embodiment, history space is enabled and configured. Log in the log space then have two data flushes: a first data flush into live space by a live flusher and a second data flush into history space by a history flusher. Periodic data flush into history space creates snapshot VDIs representing corresponding live VDI at some point in a computing process. Frequency of the historical snapshots can be set in a policy setting of the history flusher. The history flusher can accumulate multiple data flushes over periods of time and collapse the accumulated data flushes into a single snapshot into the history space.

History space contains complete data for the historical snapshots. Periodic history snapshots represent near continuous data protection feature that SMS 200 provides. If history space is added to an existing SMS 200, there is an initial copy of live space data into the history space. The history flusher take care of the changes in the live space. It corresponds to a full disk backup followed by incremental disk backups.

For newly created VDIs or a live VDI with no write in a while, log space is empty and all VDIs data resides in the live space. New writes into a VDI go to the log space of the physical machine that manages this VDI. For some period of time, the newly written VDI's data resides in the log space only, and the VDI resides in both log space and live space. The VDI's maps contain pointers to the right locations in the log space and live space. All virtual machines running in the same physical machine share the same log space, and data from all live VDIs on the physical machine is interspersed in the log space.

Log from the log space is flushed into live space with a predetermined system specific frequency. In one embodiment, a typical number for the frequency of flushing data into the live space can be between 30 and 300 seconds. As log space is dedicated to a physical machine, the frequency is not long because all data has to reach live space before a VDI can become available on a different physical machine as needed for virtual machines mobility.

A snapshot VDI from the history space can be cloned to create a new live VDI. However, such live VDI exists in history space only. Furthermore, the data that belongs to this VDI must not be flushed to live space but in history space only.

Figure 9:
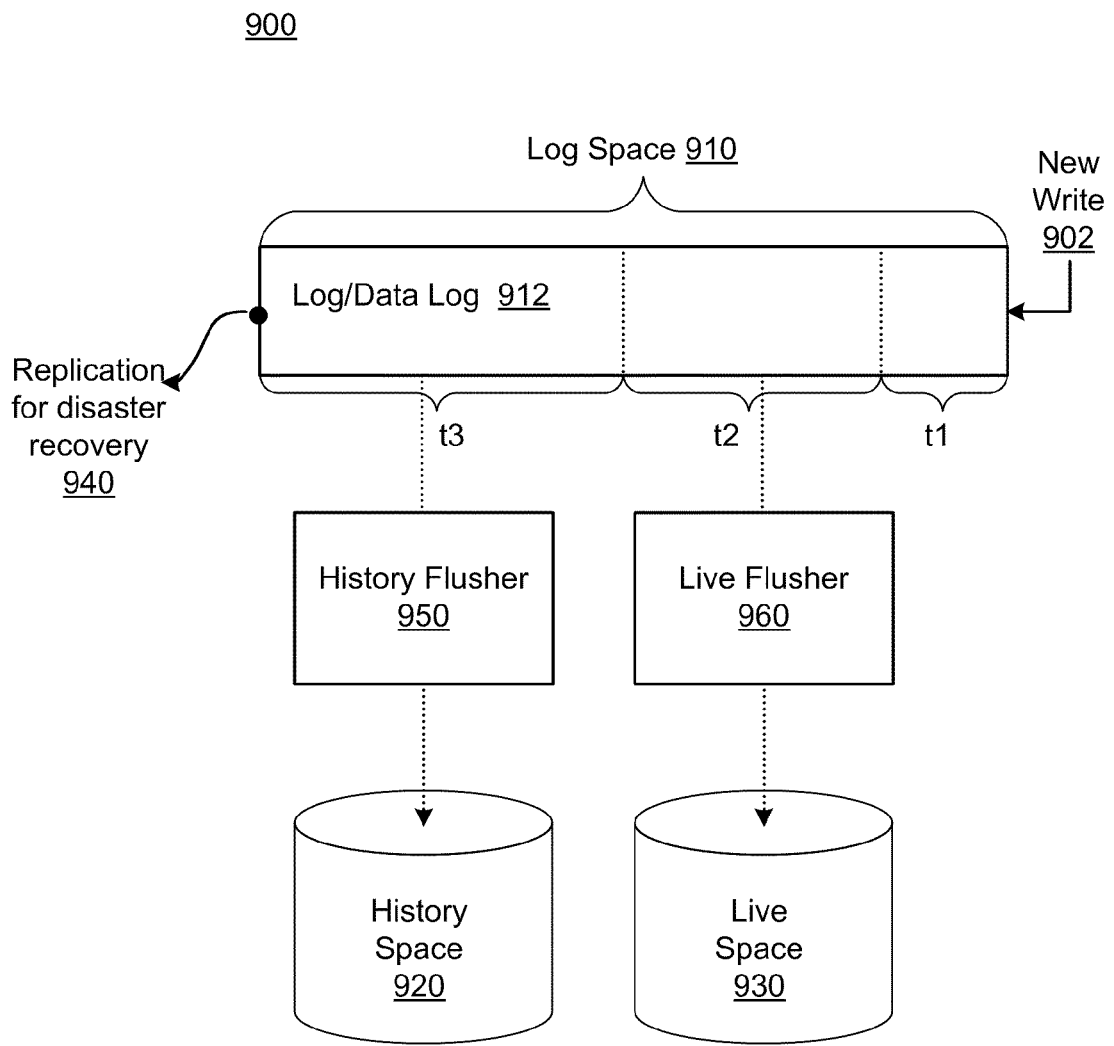
FIG. 9 is a block diagram of a disk space logically divided into three categories according to one embodiment of the invention.

FIG. 9 is a diagram of a disk space 900 logically divided into three categories according to one embodiment of the invention. The disk space 900 has log space 910, history space 920 and live space 930. A log/data log 912 is associated with the log space 910. A new write 902 is written into the log space 910 first. The storage space management module 320 provides two log data flushers, history flusher 950 and live flusher 960, to flush log data in the log space 910 to the history space 920 and the live space 930 respectively. For a period of time, such as t1 seconds, the new write 902 exists in the log space 910 only. After t1 seconds, for anther period of time, such as t2, the new write 902 is flushed into the live space 930 by the live flusher 960. Similarly, during the time period to t3, the new write 902 is flushed into the history space 920 by the history flusher 950. After the new write 902 reaches the end of t3 time period, the new write 902 is replicated for disaster recovery 940. In one embodiment, the new write 902 is stored in a dedicated storage place for disaster recovery.

Log associated with the log space in the SMS 200 is designed for write optimization. Each write in a SMS 200 is a transaction of writing data and map VDI map blocks from a logical address space represented by VDI maps to a physical address space represented by the log space. If data fragmentation is relatively high, number of map blocks that must be modified within a transaction can be substantial (e.g., up to five). The log in the SMS 200 is designed to make this transaction asynchronous. The log in the SMS 200 coalesces all the write operations that happened in certain time interval (30-300 seconds). A live flusher at a later time writes all of the data and corresponding metadata into the live space in much fewer I/O operations, making it one large asynchronous transaction instead of multiple small synchronous ones.

Log content is flushed once (into live space only) or twice (into live and history spaces). Log content can be also replicated to remote site for disaster recovery functionality. In one embodiment, log has three nested regions:

Live Log: a portion of the log that contains newly written data that is present in the log space only and not flushed into the live space;

Optional History Log: a portion of the log that is not flushed into the history space yet;

Optional Replication Log: a portion of the log that contains data that needs to be replicated.

In one embodiment, each data record in the log has the following parts: header (metadata), variable size data and tail. Metadata contains data extent magic number, sequential number, LBA and length. Tail contains magic number and sequential number. Tail helps to identify cases when the record is incomplete (for example, physical machine crashed in the middle of writing into the log).

Maps for the data blocks that are in the log for the duration are maintained in memory as a part of all VDI map data in memory. This is called a submap. Submap data gets written in the log space twice: the storage space management module 320 first puts just enough metadata information in every record in the log to make it possible to replay the log and recover the maps. In other words, submap data gets spread among all of the log records. Second writes happens periodically, for example, every 30-300 seconds, when the storage space management module 320 writes the entire submap accumulated during this time into the log. The corresponding log record is called log mark. In other words, a log mark contains the submap for the data in the log written in the last time interval.

These two kinds of submap data are used for log replay in case of system crash to ensure data and metadata consistency. Log replay starts with the last log mark, then reads the individual log records and reconstructs submap in memory. Log mark is associated with all VDIs that are managed by a specific physical machine. Submap in memory can grow large. In response to submap in the memory growing larger, the storage space management module 320 writes log mark ahead of a scheduled time interval and reuses the memory after writes. This effectively creates an extra unscheduled snapshot.

In one embodiment, marks in the log are done based on a technique similar to memory barriers such that log mark is a guarantee that all data writes in the log before it have completed. A log mark can also be used as a crash consistent snapshot mark. For example, the storage space management module 320 uses the log mark through a history flusher to construct snapshots in the history space. If writing into the log is faster than writing into live space, amount of un-flushed data in the log grows. The storage space management module 320 guarantees that metadata cache contains all of the maps data describing data in the log.

A log mark looks exactly like any other record in the log. It contains a header, variable size of data, and a tail. There are two kinds of log marks—periodic and user requested. A periodic log mark contains VDI map blocks for all VDIs on a specific physical machine. A user requested log mark logically contains only map blocks for VDIs involved in the user requested snapshots. Log mark format is the same for both kinds, except that the user requested log mark has VDIs of interest marked with a flag. This flag is used later by a data flusher (e.g., history flusher or live flusher) to propagate the snapshot into the live space as a user visible snapshot.

A log mark data record contains:
Log mark number: corresponding to a log mark registry;
Log mark flags: like "create snapshot VDI in live space" and other flags;
VDI root pointers table: contains one or more pairs [VDI-ID, Root-pointer]. The root pointer helps to reconstruct submap of a VDI that is present in the snapshot;
User visible snapshots table; and
VDI submap.

Snapshots can be taken on a VDI during its normal read/write operation. The snapshots semantics are strictly asynchronous; snapshots are issued directly into the stream of IO requests in a manner similar to log mark. In other words, a VDI snapshot is a log mark that contains only submap for this VDI. The snapshot is said to be "complete" when the snapshot mark is correctly placed in the log. These snapshot semantics enable the SMS 200 to complete a snapshot without pausing or delaying the IO requests, by allowing both pre-snapshot and post-snapshot IO to complete on their respective views of the disk after the completion of the snapshot.

In order to simplify locating the latest log mark, the storage space management module 320 maintains a short fixed size record that contains pointers to log marks. This short-fixed size record is log mark registry. The log mark registry is stored in a predefined place in the log space. The log mark registry is stored in a transactional manner. The log mark registry does not have to be stored as part of a log mark transaction because log mark data can be recovered as long as the storage space management module 320 can find a recent log mark and replay the log from that point.

A log mark registry shares the same log space with data log. The log mark registry does not affect write performance in the log space because the log mark registry modification is fairly infrequent, e.g., once per snapshot, or even every several snapshots (that is presumably once per 3-5 minutes). The log mark registry has a fixed size that can be estimated as following: N*8, where 'N' is a maximum number of live VDIs that are active on a physical machine. In one embodiment, 'N' is set to 1024 by the storage space management module 320.

Figure 10:
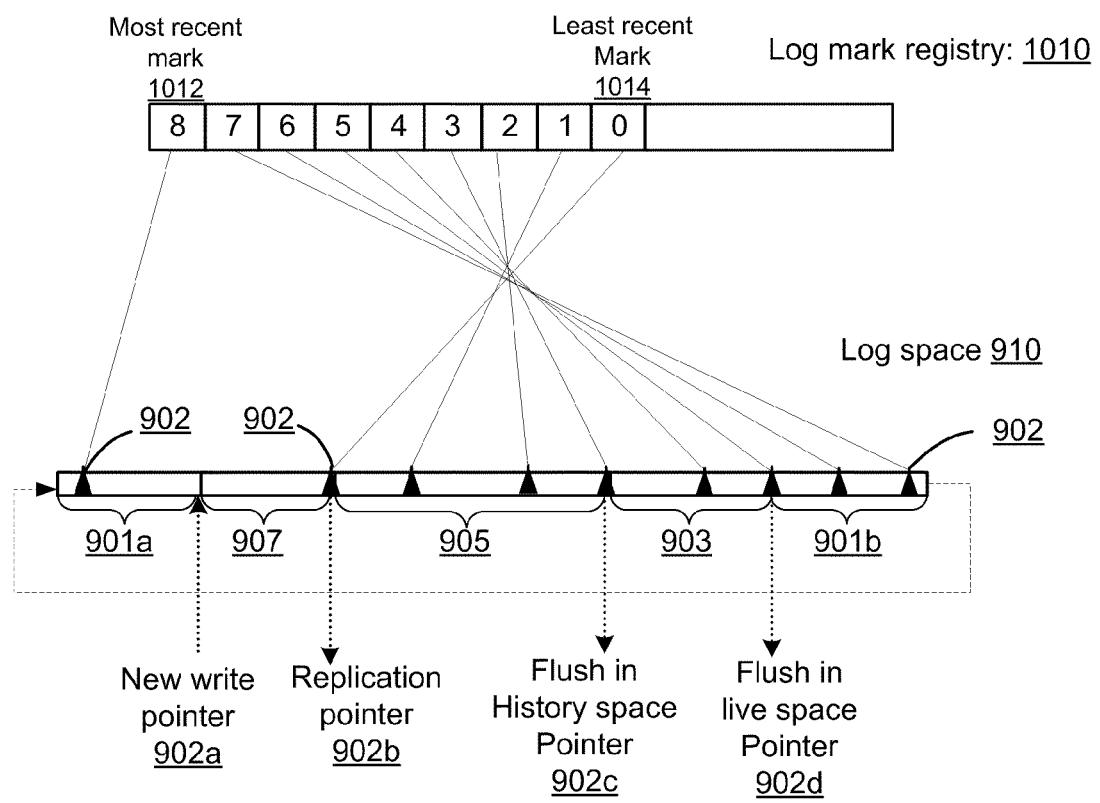
FIG. 10 is a diagram of an example of a structure of a log mark registry according to one embodiment of the invention.

FIG. 10 is a diagram of an example of structure of a log mark registry 1010 according to one embodiment of the invention. The log mark registry 101 illustrated in FIG. 10 has 9 log marks, where log mark 0 (1014) corresponds to the least recent mark and log mark 8 (1012) corresponds to the most recent mark. FIG. 10 also illustrates log space 910 with total 9 log marks corresponding to the ones in the log mark registry 1010. For example, the log space 910 is divided into two live logs 901a-b, a history log 903, a replication log 905 and a free space 907. Between two neighboring logs/space, there are four pointers 902a-d indicating the locations of a log data. For example, the least recent mark 1014 has a corresponding replication pointer 902b in the log space 910, which indicates the location of the log data to be replicated. The new write pointer 902a points to the location of the new write in the log space 910. The flush in history space pointer 902c points to the location of data log to be flushed into the history space. Similarly, the flush in live space pointer 902d points to the location of data log to be flushed into the live space.

Live and history spaces are allocated in large (e.g., 2 GB), contiguous units in physical address space extents, called SMS allocation units (VAU). Each physical machine is fully responsible for allocation inside the VAU for VDIs currently running on it. Each VAU is divided into multiple 4M pages that are contiguous in physical address space. At any point in time, a single SMS 200 instance has one or two active VAUs: one for live space and another—optional—for history space. A live VDI is not mixed with a snapshot VDI in a VAU because live space is optimized for performance and optionally can reside on separate storage pool with better quality of service. For example, live space can reside on fast SAS drives and history space on high capacity SATA drives.

A VAU is identified by a unique number. A VAU cannot cross underlying volumes boundaries. VDIs reside on multiple VAUs. Several VDIs can share a same VAU. Each VAU can be assigned to a specific physical machine or belong to master service 400. Master service 400 is to be described further in conjunction with description of FIG. 16. Majority of VAUs are pre-allocated among physical machines. This way of allocation minimizes communication with the master service 400 for additional VAU allocation at runtime.

Each VAU at any given point in time is being used for allocation by a single physical machine. VAU that is being consumed by a physical machine for allocation is called an active VAU for this physical machine. All VDIs running on this physical machine share the same active VAU. VDIs spread across multiple VAUs, active and not, such that many VAUs are accessible for reading.

Each VAU assigned to a physical machine can be in one of several states: unassigned, full, active or assigned. Master service 400 owns a predefined number of VAUs to be assigned to a physical machine on demand. A full VAU was active and has been filled out completely. SMS drivers 300 release full VAUs back to the master service 400. An active VAU is being used by a physical machine for physical space allocation. An assigned VAU is given to a physical machine to use and becomes active upon being used by the physical machine.

VDI map and data live in a single log and multiple VAUs. VAUs contain the VDI map blocks and VDI data extents. Multiple VDIs share the single VAU. However, each physical machine having a SMS 200 instance running on this machine controls space allocation in the active VAU. Multiple physical machines can read the VDI maps and data from the same VAU.

For example, assuming that a physical machine handles two VDIs, each of which belongs to two different virtual machines 1 and 2 respectively. Data extents and map blocks of the VDIs are mixed in the same active VAU. If later at least one of these virtual machines will be restarted on another physical machine, the two physical machines read the same VAU that contains the data extents and map blocks from both VDIs.

There are several objectives to be considered in space allocation algorithms by the storage space management module 320. One of them is to minimize data fragmentation in live space. In one embodiment, a physical machine, i.e., the owner of one or more VAUs, allocates space inside the active VAU in fixed size 4M pages. The way these 4M pages are used in live space and history space is different. Live space is more performance sensitive. The storage space management module 320 minimizes data fragmentation in live space by allocating a whole 4M page contiguously in physical space and VDI logical space exclusively for a specific VDI. In history space, multiple VDIs from the same historical period share a same 4M page. The storage space management module 320 switches to the new page when current page is full or it moves to the next snapshot in history space. As the storage space management module 320 switches to the new VDI for new history snapshot, the previously active page is left partially unused. Virtual machines using inactive VDIs can result in significant space overhead. In this case, the history flusher may decide to skip the periodic snapshot since there is very little value doing it anyways. Keeping space allocation localized per historical snapshot allows for much easier space reuse when snapshots are removed from history space.

Another objective to be considered in space allocation algorithms by the storage space management module 320 is to ease de-allocation and garbage collection by separating objects by their time of de-allocation. Live and history spaces are allocated in a context of flushers, not in a context of requests from virtual machines (I/O steams optimization might be an exception). Map blocks and data extents share VAU space but use separate pages. Space allocation for map blocks and data extents is identical and is page based. A single page may contain data extents (called data page) or VDI map blocks (metadata page). In order to simplify free space management in live space, the storage space management module 320 does not mix map blocks from different VDIs in a single metadata page. However in history space multiple VDI map blocks do share the same page. History space allocation is not a problem because historical snapshots deletion is done by the whole pages allocated per historical period. This means that 4M page is the smallest object that needs to be considered by garbage collector and space reuse logic.

The first 4M page in each VAU is metadata page. In most cases this is the only metadata page in the VAU. If written data is very fragmented, there may be a need for more metadata pages. They are allocated intermixed with data pages in the VAU. Metadata pages contain fixed size map blocks with 4K each. The first metadata page in each VAU contains two 4K extents as a redundant free pages bitmap. Free blocks and free pages bitmaps share same 4K extent. Redundant free pages bitmap makes its changes transactional. If the storage space management module 320 has to modify the free pages bitmap, the storage space management module 320 writes the second copy first and then the first copy.

In one embodiment, a bitmap extent of 4K size comprises a header of 64 bytes long, a free pages map of 64 bytes, another free pages bitmap of 128 bytes long, a data/metadata bitmap of 128 bytes long and a tail of 64 bytes. The header contains the magic number, sequential number, total number of free blocks and total number of free pages. It is followed by free blocks and free pages bitmaps (64 and 128 bytes respectively), reserve field and tail. Tail also contains magic number and sequential number that guarantee together that bitmap extent has been written completely.

Log, live, and optional history spaces reside on the set of block devices called SMS volumes or simply volumes. Each SMS block device has a private region or a SMS label that identifies it. The label contains the following information: magic number, SMS ID that this volume belongs; volume ID and PBA of VAU that contains Master VDI. Master VDI is to be further described below. If the SMS label does not exist or does not contain appropriate information (for instance, the SMS ID does not match current one), the block device cannot be used.

SMS ID identifies the SMS the volume belongs to. The SMS ID prevents from moving storage from one SMS entity to another. Volume ID is a 16-bit number that uniquely identifies a volume within the SMS 200. Volume ID presents in PBA in bits [46:61]. Being set once, the volume ID does not change. The PBA of VAU that contains Master VDI allows for an easy way to locate Master VDI root map block without any external assistance. It is possible because its location in the VAU is fixed. This allows a SMS driver 300 to locate Master VDI and provide for master service bootstrap.

SMS label is written once by the SMS driver 300 under master service control, and the SMS driver 300 runs on the same physical machine that the Master VDI does. Upon boot the SMS drivers 300 discovers SMS storage volumes, open them, and read labels from all volumes—members of this SMS instance. The SMS drivers 300 maintain the table that links volume ID with block device handle. Each time when a VDI is going to be connected, master service 400 checks that all SMS volume devices presence in the system. If not, it rejects the VDI connect request.

Figure 11:
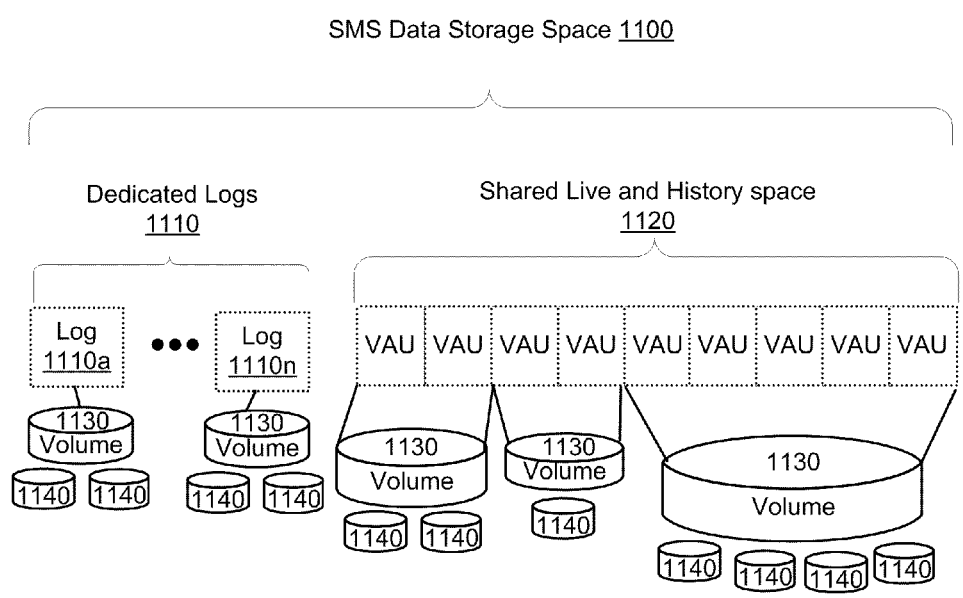
FIG. 11 is a block diagram of a data storage space of a storage management system according to one embodiment of the invention.

Turning now to FIG. 11, FIG. 11 is a block diagram of a SMS data storage space 1100 according to one embodiment of the invention. The SMS data storage space 1100 comprises a log space of dedicated logs 1110*a*-1110*n* and a shared live and history space 1120. Each dedicated log 1110 corresponds to a volume 1130 which is a set of physical data storages devices 1140. The shared live and history space 1120 comprises multiple VAUs. Two or more VAUs correspond to a volume 1130 which is a set of physical data storage devices 1140. The storage space management module 320 manages the physical address space represented by the sets of volumes as described above. For example, the storage space management module 320 allocates the log space per physical machine basis. If a physical machine is no longer present, the log needs to stay for duration of flushing into live and (optionally) history space. Once log is completely flushed, it can be reused for some other computing purposes.

Methods

The SMS 200 presents the abstraction of physical volumes as multiple block devices to guest VMs via SMS drivers 300. The SMS drivers 300 translate logical address to physical addresses on the underlying physical volumes responsive to the I/O requests from a backend driver. A block device driver reads from and/or writes into the physical volumes 130*a-d* based on the address space translation from the SMS driver 300.

Figure 12:
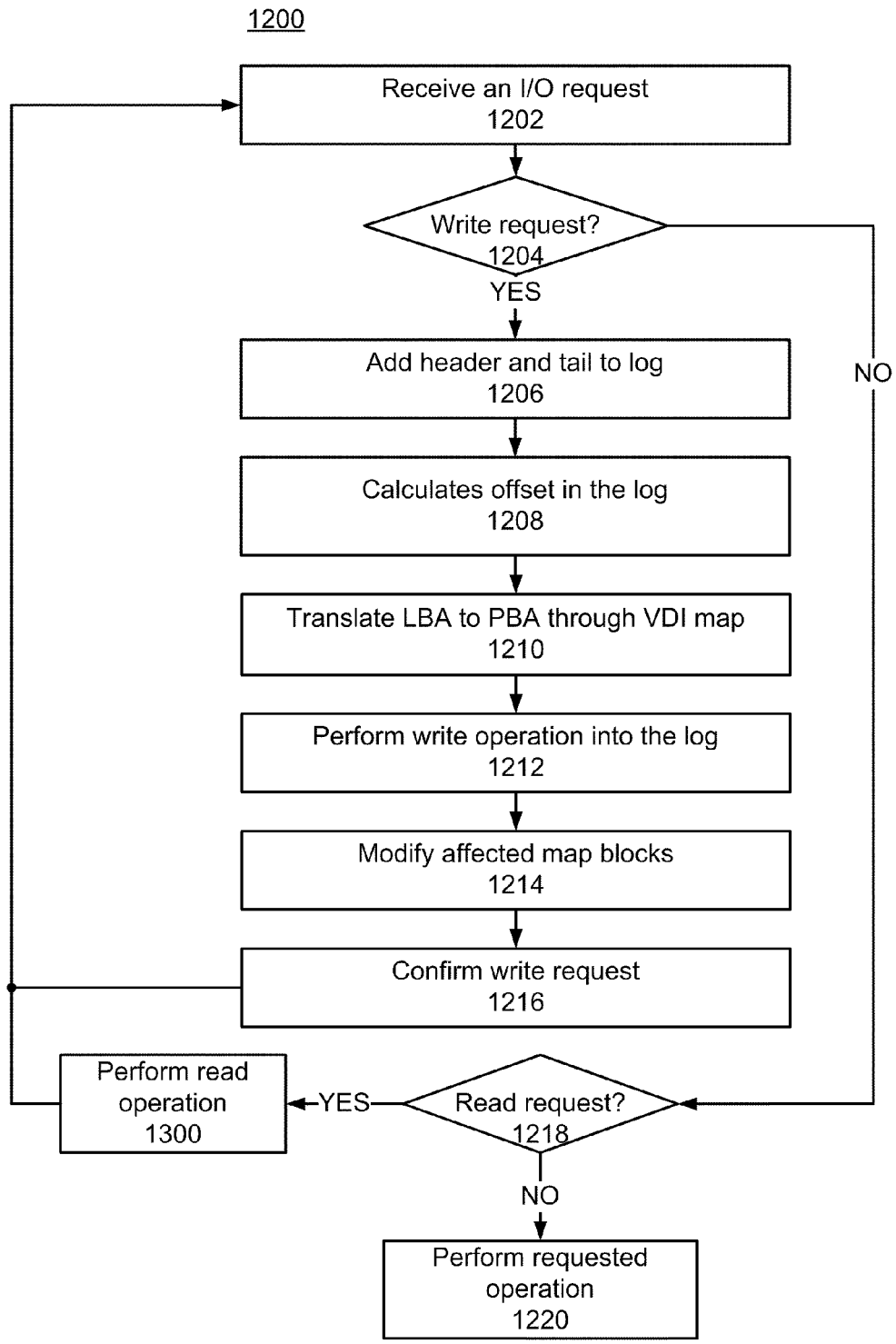
FIG. 12 is a flow chart illustrating an example of processing an input/output request by the storage management system illustrated in FIG. 2 according to one embodiment of the invention.

FIG. 12 is a flow chart illustrating an example of processing an I/O request by the SMS 200 illustrated in FIG. 2 according to one embodiment of the invention. Initially, the SMS 200 receives 1202 an I/O request from a virtual machine. In one embodiment, the I/O request contains information of a logical block address and buffer length requested. The SMS 200 checks 1204 whether the I/O request is a write request. Responsive to the I/O request being a write request, the SMS 200 adds 1206 the header and tail of the I/O request to the log associated with the virtual machine. The SMS 200 calculates 1208 the offset in the log based on the logical block address and buffer length in the I/O request and translates 1210 the LBA to the PBA through VDI map. Specifically, the SMS 200 constantly maintains current log mark. The SMS 200 calculates the offset for each map block inside the current log mark. Pointers at map blocks that reside in the log mark (i.e., PBA in the map block record) require special treatment and such PBA contains two parts—log mark number and relative offset inside log mark. Unique log mark number helps the SMS 200 keeping multiple log marks: new blocks with same offset from different log marks have different PBAs. The SMS 200 parse LBA and uses the log mark number as key for searching a log mark registry in order to obtain absolute map block address inside the log. The SMS 200 performs 1212 the write operation into the log based on the above translation. Further, the SMS 200 modifies 1214 affected map blocks and allocates new ones if needed. Modified map blocks do not stay in place. Instead, the modified map blocks are reallocated into the log mark area. Allocation is done as described in step 1210. For map blocks that are already in the log mark, these map blocks are already dirty. The SMS 200 obtains new map blocks after relative PBA is determined. This requires translation of original LBA into a chain of affected map blocks. Responsive to the write into the log being complete, the SMS 200 confirms 1216 the write request. The SMS 200 returns to step 1202 to receive next I/O request after the write confirmation.

Figure 13:
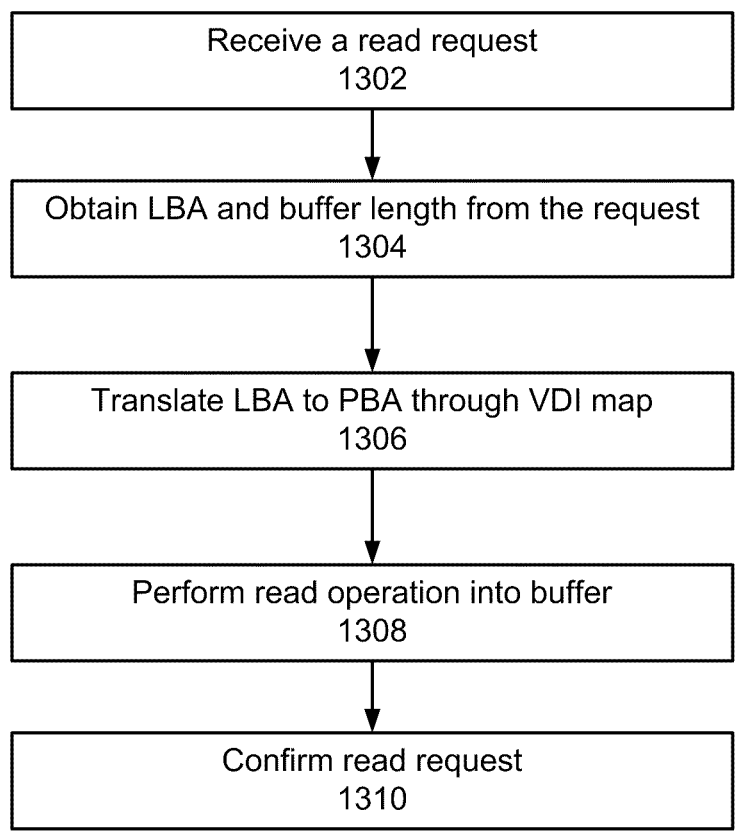
FIG. 13 is a flow chart illustrating an example of processing a read request by the storage management system illustrated in FIG. 2 according to one embodiment of the invention.

Responsive to the I/O request being not a write request, the SMS 200 checks 1218 whether the I/O request being a read request. If the I/O request is not a read request, the SMS 200 performs 1220 the requested operation. Responsive the I/O request being a read request, the SMS 200 performs 1300 the read request as illustrated in FIG. 13. FIG. 13 is a flow chart illustrating an example of processing a read request by the SMS 200 illustrated in FIG. 2 according to one embodiment of the invention. Initially, the SMS 200 receives 1302 a read request from a virtual machine. In one embodiment, the read request contains information of a logical block address and buffer length requested. The SMS 200 obtains 1304 the LBA parameter and buffer length from the read request. The SMS 200 calculates the offset in the log based on the LBA and buffer length in the read request and translates 1306 the LBA to the PBA through VDI map similar to step 1210 illustrated in FIG. 12. The SMS 200 performs 1308 the read operation from the log based on the above translation. Responsive to the read from the log being complete, the SMS 200 confirms 1130 the read request.

Figure 14:
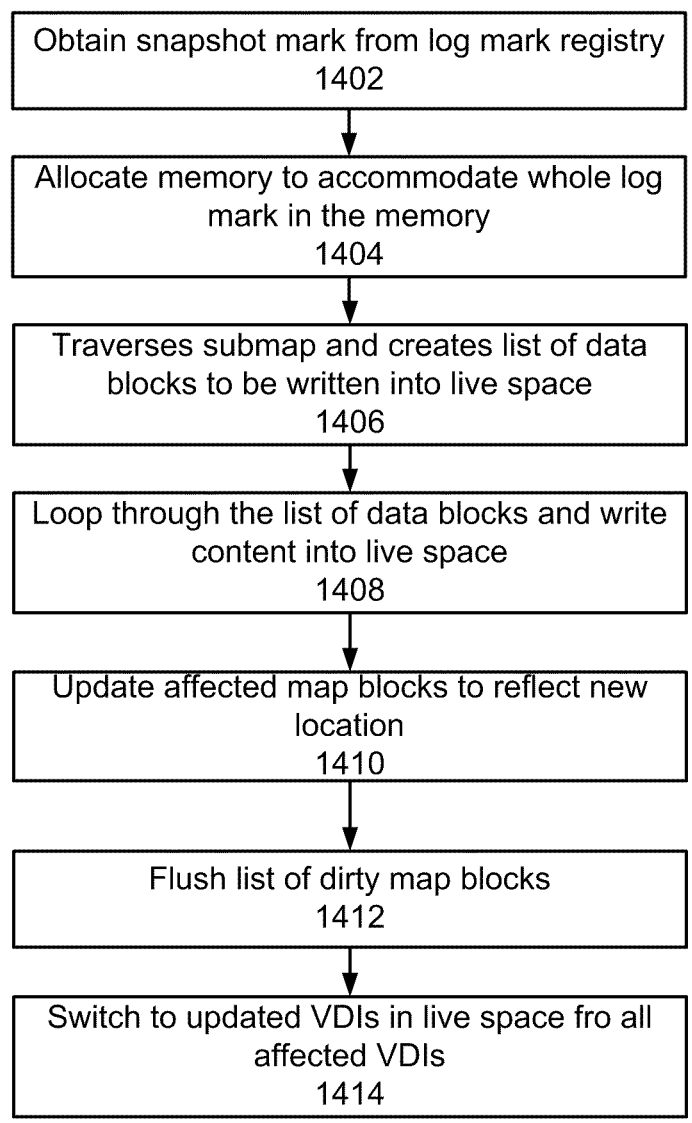
FIG. 14 is a flow chart illustrating an example of flushing snapshots of disk images into live space of the storage management system according to one embodiment of the invention.

FIG. 14 is a flow chart illustrating an example of flushing snapshots of disk images into live space of the SMS according to one embodiment of the invention. A live flusher of the SMS 200 inherently optimizes writing into the live space. Specifically, data extents are coalesced automatically while the live flusher creates a list of data extents that need to be flushed into the live space. In other words, flushing snapshot is one big I/O operation rather than multiple small ones.

Initially, the SMS 200 obtains 1402 the snapshot mark that needs to be flushed into the live space. In one embodiment, a live flusher of the SMS 200 uses the log mark registry to determine the snapshot to be flushed and gets information, such as log mark offset in the log, log mark size, etc. of the determined snapshot. The live flusher allocates 1404 memory to accommodate the whole log mark in the memory and reads the content into this buffer (i.e., the newly allocated memory). The log mark registry allows such memory allocation because the log mark registry has an area that contains information about all the modified map blocks. The live flusher traverse 1406 the submap of the log and creates a list of data blocks in the log that need to be written into the live space. After traversing the submap, the live flusher discards the log mark in memory and frees the memory containing the log mark. No I/O operation is needed to free the log mark in memory. The live flusher starts looping through 1408 the list of data blocks reading data extents from the log and writing the data extents into the live space. For example, the live flusher accesses map blocks from the live space. The live flusher modifies the map blocks accordingly and maintains the list of dirty map blocks. The modified map blocks need to be reallocated in the live space to help maintain transactional nature of flush, e.g., allocate new PBA for a map block and to obtain map block in memory.

New data and map block allocation changes free bitmaps in an active VAU. These changes are kept in memory. The bitmaps is stored simultaneously with the VDI root pointer as a transaction now needs to be updated to reflect new location. The live flusher updates 1410 the affected map blocks to reflect the new locations. In one embodiment, the SMS 200 updates the affected map blocks using a "lazy-cutoff" procedure, which is further described in detail below. Responsive to the data flush being complete, the live flusher flushes 1412 the list of dirty map blocks. The map blocks are marked clean in the cache automatically by the live flusher. The live flusher switches 1414 to the updated VDI maps in the live space for all affected VDIs. The live flusher modifies the VDI root pointer as a transaction. Allocation information—changes to free bitmaps—is also recorded as part of this transaction.

Generally, log marks and data are not overwritten in the log until they are flushed into history space. A history flusher works almost identical to the live flusher described in conjunction with FIG. 14 with only one exception: the history flushers creates a snapshot VDI when it flushes a snapshot. Snapshot VDI can be created per each flushed snapshot or less frequently based on instructions from a SMS administrator.

The active VDIs map needs to be updated in memory (log space 910) as a live flusher 960 relocates data blocks from the log into the live space. The active VDIs map can be updated proactively or lazily. Proactively updating the VDIs map can become a performance bottle neck. In lazy VDIs map update, the SMS 200 maintains the range of valid physical address in the log, checks every address reference for validity, and fetches the correct address when necessary from the live space. The range of valid physical addresses in the log is easy to determine: it is the un-flushed area. Every physical address that refers to the log space 910 is checked for validity by the SMS 200. If a physical address points into the area of the log that is already flushed, it means that the map record needs to be updated. A valid physical address is obtained by looking up the logical address in question in the live space. These new physical address replaces the invalid one in the cached map block using the lazy cutoff procedure. No disk map blocks need to be touched.

Figure 18:
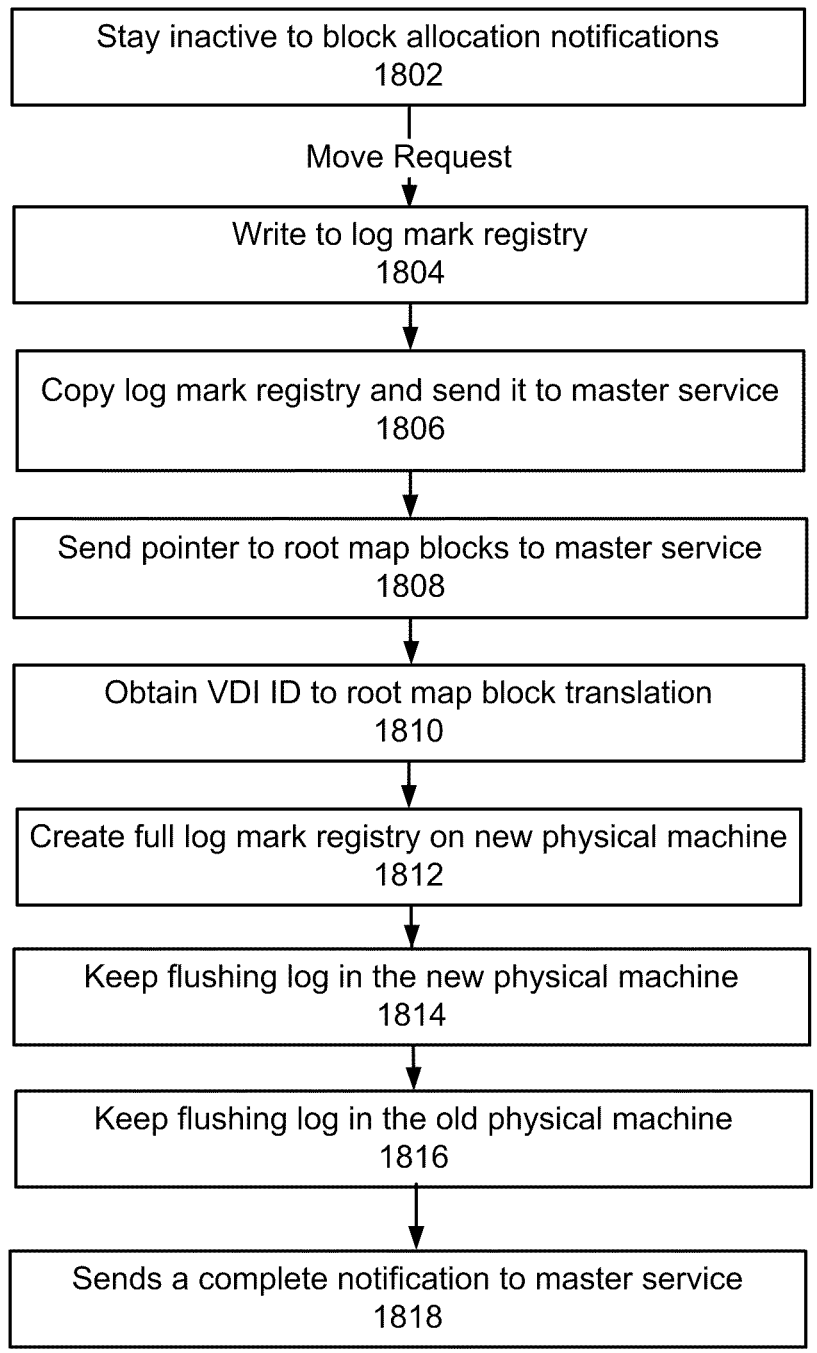
FIG. 18 is a flow chart illustrating an example of a "lazy-cutoff" procedure to reflect new locations of map blocks after being relocated according to one embodiment of the invention.

FIG. 18 is a flow chart illustrating an example of the "lazy-cutoff" procedure 1800 to reflect new locations of map blocks after being relocated according to one embodiment of the invention. Initially, the SMS 200 is inactive 1802 to early block allocation notifications. Responsive to a move request where the VDIs are about to be disconnected from the virtual machine having the VDIs, the SMS 200 writes 1804 one or more log marks with the VDIs that are to be moved. The SMS 200 copies 1806 the log mark registry and sends the log mark registry to the master service 400 along with a VDIs disconnect notification. The log mark registry data is used for the lazy cutoff procedure on a new physical machine. The log mark registry data becomes a part of the attributes associated with the VDIs being moved. The SMS 200 also sends 1808 the pointers to the root map blocks to the master service 400 along with the disconnect notification. It is noted that the live flusher 960 on the old physical machine keeps working as usual.

Responsive to a virtualization platform starting a virtual machine on the new physical machine, the SMS 200 on the new physical machine sends the master service 400 a connect request to obtain 1810 VDI ID to root map block translation. The master service 400 returns references to the root map blocks in the old log as well as previously saved log mark registry from the old physical machine. The SMS 200 on the new physical machine creates 1812 full log mark for active VDIs before the SMS 200 confirms VDIs being moved. This log mark is used as synchronization barrier between flushers on the new and old physical machines. As the virtual machine on the new physical machine is running, new data is written in the new log of the new physical machine.

As the VDIs maps have references to the old log, the lazy cutoff algorithm is fully deployed for the VDIs being moved. The live flusher 960 on the new physical machine keeps flushing 1814 the log 910 until it reaches the point where the VDIs being moved are connected. It is noted that the live flusher 960 in the new physical machine cannot cross this point until the live flusher 960 on the old physical machine completes flushing the data for the VDIs being moved. At the same time, the live flusher 960 on the old physical machine keeps flushing 1816 data from the old log to the live space. When the flusher on the old physical machine gets to the log mark that was created upon VDIs being moved, the SMS 200 sends 1818 a notification to the master service 400, which relays the notification to the new physical machine. As a result, the updated data effectively validates the old log registry data. The old and new physical machines complete the lazy-cutoff procedure and resume normal operations.

Master Service 400

Referring back to the SMS 200 illustrated in FIG. 2, in SMS 200, a virtual machine runs a single, system cluster wide management service called Master Service 400 or simply Master. Master Service 400 provides multiple functionalities to the SMS 200 including global VDI ID to root map block translation, allocating VAU to VDI IDs upon SMS driver 300 request, maintaining VDI namespace and SMS objects database, and communicating with a virtualization platform management system that runs a SMS graphical user interface (GUI). The Master Service 400 communicates with the SMS drivers 300 via a communication interface 210 using one or more SMS internal communication protocols.

In one embodiment, Master Service 400 runs as a special virtual machine or virtual appliance. It can run on any physical machine in the SMS 200. It is assumed that a virtualization platform guarantees that single copy of Master Service 400 always runs in a SMS cluster (except for short period of time when Master Service 400 is restarted or moved/failed-over on another physical machine).

Master Service 400 uses local API to communicate with a local SMS driver 300. The API provides specific access to the SMS physical storage that allows Master Service 400 to implement functions like garbage collection, destroying VDI, etc. without having direct access to the SMS physical storage. In other words, Master Service 400 accesses physical storage indirectly via the API. A SMS driver 300 on a physical machine can start without Master Service 400. However, it is more practical to have a Master Service 400 to activate/connect any VDIs to virtual machines.

Master Service 400 manages multiple persistent system objects that depend from each other in a system-wide object database. Each system object in the object database has state, attributes and methods. Methods associated with an object are specific to the object and do not change. Attributes are persistent qualities of the object and are stored in the object database. State is not persistent and is kept only in memory. Table III illustrates some system objects in the objects database of the SMS 200. Those skilled in the art will recognize that TABLE III represents one example of an embodiment for groupings of object, state, attribute and extension of the object database of the SMS 200. A variety of other embodiments for groupings of the object, state, attribute and extension of the object database are possible.

TABLE III

System Objects Database

| Object | State | Persistent Attributes | State Extension |
|---|---|---|---|
| Physical Volume | Present and working Present and failed Not present | SMS volume ID Space it belongs to (Log or Live/History space) Owner: valid only for volumes that contains Log; indicating physical machine ID that owns the log | Detailed information describing the reason of volume failure |
| Physical Machine | Present Not present | Machine ID SMS driver cluster ID running on this machine | |
| SMS Entity Object | Working In jeopardy (e.g., master VDI has failed) Failed | SMS ID Master Cluster ID (e.g., cluster-wide IP address) Volume ID VAU number that contains Master VDI | Detailed information describing the reason of the SMS failure (e.g., not all physical volumes present, object database down; Master VDI failed) |
| VDI | | Status: 1. connected and clean 2. connected and not clean | |

TABLE III-continued

System Objects Database

| Object | State | Persistent Attributes | State Extension |
|---|---|---|---|
| | | 3. disconnected and clean | |
| | | 4. disconnected and not clean | |
| | | 5. destroying | |
| | | 6. merging data into a single child | |
| | | VDI name | |
| | | VDI ID | |
| | | Physical machine ID running this VDI | |
| | | Type (live VDI or snapshot VDI) | |
| | | Reference count | |
| | | Claimed size | |
| | | Size on disk | |
| | | Quotas (disk space and bandwidth limitations) | |
| VAU | | Owner (physical machine ID; 0 means Master) | |
| | | Available size | |
| Available VDI ID Regions | | Owner (physical machine ID; 0 means Master) VDI ID range (e.g., [from:to] format) | |

It is noted that VDI and VAU objects are persistent system objects that do not have state. The SMS entity object represents the whole SMS 200 in terms of system object. In other words, the SMS 200 is fully functional if the SMS entity object indicates that the SMS physical storage repository is working properly and the Master Service 400 fully is functioning. For example, without the Master Service 400 fully functioning, new VDIs cannot be connected and new virtual machines cannot be started. Master Service 400 is not treated as an independent SMS entity object in the SMS 200, but as a part of the SMS entity object. An administrator of the SMS 200 has access to all types of the system objects in the object database of the SMS 200.

Each VDI in the SMS 200 is identified by a unique ID, which is used to link the VDI to its root map block. The Master Service 400 provides a mechanism to translate the VDI ID into its root map block pointer. For VDIs that are not active (connected) on any physical machine at the moment of running, the system object database contains information about the inactive VDIs, e.g., their root map pointers. For an active VDI, the object database has a record pointing to the physical machine that serves this VDI at the moment of the request. The actual root map block is maintained by that physical machine.

When active VDI is being deactivated/disconnected (e.g., a virtual machine shuts down or has to be moved elsewhere), a log data flusher must flush the log first and then interact with Master Service 400 to report both the deactivation of the VDI and its final root map block location. Master Service 400 marks the final root map block location in the object database. Conversely, when a VDI is being activated or connected, the SMS driver 300 that performs the connecting interacts with Master Service 400. Master Service 400 provides the root map block address and registers the VDI as active. This is when and how the SMS 200 ensures exclusive access to VDIs.

Each snapshot VDI has an ID that can be used to obtain the snapshot VDI's root map block for cloning operation. Snapshot VDIs are translated through the same mechanism as for live VDIs. A running physical machine maintains current mapping for active and most recently created snapshot VDIs. The mapping has to be persisted in a local private area maintained by this physical machine—local ID translation table—so that this information can be recovered on reboot. This is also where the information is stored if Master Service 400 is temporarily unavailable.

A SMS driver 300 needs VDI ID to be assigned to newly created snapshot VDIs in live and history spaces. A VDI ID can be obtained from Master Service 400. In order to avoid "urgent" communication with Master Service, Master Service 400 provides a range of available VDI IDs to each SMS driver 300. The information of the available VDI IDs is stored in the "Available VDI ID Regions" object in the object database of the SMS 200.

Master Service 400 is responsible for VAU allocation to physical machines. Further VAU usage is managed by specific physical machine. VAU allocation in the SMS 200 is designed in such a way that communication between the SMS drivers 300 and Master Service 400 is very infrequent. Furthermore, a SMS driver 300 can handle VDI I/O requests even if Master Service 400 is down for relatively long period of time.

Specifically, Master Service 400 is responsible for managing VAU allocation for SMS drivers running on all physical machines in the SMS 200, and provides this information to the SMS drivers 300 on their start, on request, and on changes in physical layout of the SMS 200 such as adding new physical machines and/or storage volumes. Master Service 400 also performs reallocation of unused assigned VAUs on demand from a physical machine running out of space. Unassigned VAUs (owned by Master Service 400) can be assigned to a specific physical machine for exclusive usage. If the physical machine has been removed from the service (i.e., does not belong to the SMS cluster anymore), its VAUs is transferred/reassigned among the rest of physical machines in the cluster.

A physical machine as a new member of the SMS 200 gets from Master Service 400 dedicated log and a set of VAUs. It means that a system administrator needs to keep a number of unallocated spindles that can be used for logs. Master Service 400 keeps information regarding all VAUs persistently in the object database. For Master Service 400 owned VAUs, there is available space information that is used to organize these VAUs in buckets by available space. For VAUs assigned to physical machines, only this assignment is stored in the object database. A physical machine notifies Master Service 400 when it is done with a VAU and is ready to release it back to the Master Service 400. This happens when an active VAU has no more usable space. It allows Master Service 400 to provide cluster-wide and per physical machine storage prediction and VAU allocation management.

SMS driver 300, through the VDI namespace module 330, keeps information about its VAUs status changes (from assigned to full) in the local persistent store that is a part of physical machine log space. This store is cleaned by the SMS driver 300 when Master Service 400 has handled the VAU status change notification and changed VAU ownership in the objects database (from physical machine to Master Service 400).

Turning now to Master Service 400 implementation, Master Service 400 uses special VDI (like an inode in a file system) that contains namespace database using standard I/O service to access this special VDI. The special VDI is referred to as Master VDI. Master VDI is always live and visible in Master Service 400. Normally, Master Service 400 boots off the Master VDI and mounts it as its root partition. High level configuration is stored in a file system tree on this Master VDI.

Master VDI (or more precisely, a file system mounted on this VDI) contains all configuration and management information that is required for running the SMS 200. Master VDI is created as a part of SMS 200 initialization process. Its location is discovered by SMS driver 200 without Master Service 400 assistance because Master Service 400 needs Master VDI first to start its service.

A SMS driver 300 finds the Master VDI or its root map block by canning all available volumes and locating volumes that belong to a SMS storage device. At least one of the scanned volumes contains Master VDI. The SMS driver 300 further reads the SMS label from each volume and finds the volume that has Master VDI indicator set. The SMS label has a pointer (i.e., a VAU index) at the VAU that contains Master VDI.

Figure 16:
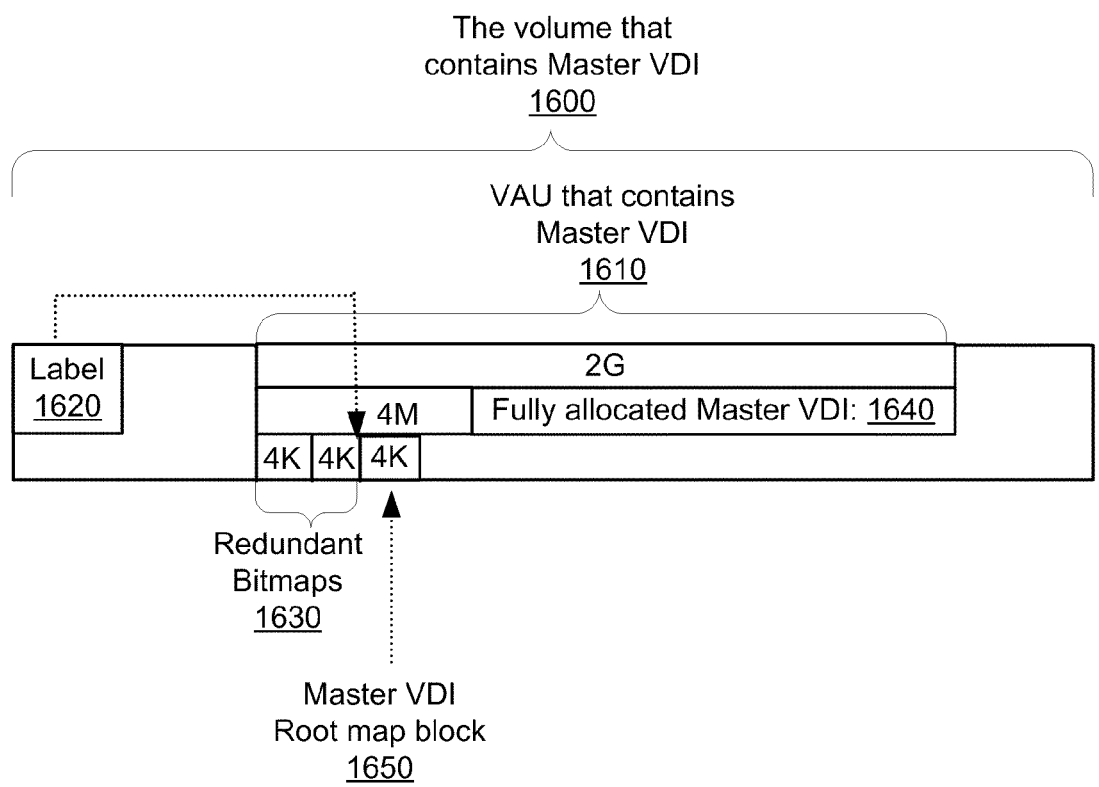
FIG. 16 is a diagram of an illustration of a master virtual disk image discovery during system management system initialization process.

FIG. 16 is a diagram of an illustration of Master VDI discovery during system management system initialization process. The SMS driver 300 scans multiple available volumes and locates the volume 1600 that contains Master VDI. The SMS driver 300 reads the SMS label 1620 from the volume 1600 that contains Master VDI. The SMS label 1620 has a pointer (the dashed arrowed in FIG. 16 starting from the SMS label 1620) at a VAU that contains Master VDI. The VAU has a size of 2G and is divided into multiple 4K extents. The first two 4K extents contain redundant bitmaps 1630 and the third 4K extent 1650 contains Master VDI root map block. The rest of the VAU 1640 contains fully allocated Master VDI. Thus, the SMS driver 300 can find Master VDI root map block itself without regular translation VDI ID to the pointer at root map block Master VDI is fully allocated, unlike regular VDIs that are typically allocated as thin provisioned. It means that new writes goes directly to the disk without VDI map modification. In other words, it allows Master VDI to never write data in the log of log space. It simplifies Master Service 400 fail-over and bootstrap.

Master VDI contains a standard file system. Master Service 400 mounts (or boots off) Master VDI and accesses information in Master VDI via regular file system calls. In one embodiment, Master VDI includes the following sections (in form of files or directories):

Identification section:
  SMS ID
Cluster section:
  Last known set of physical machines
  Cluster ID for all SMS drivers 300
  Master Cluster ID
Storage section:
  Last known set of volumes in form of volume ID that contain Log spaces for physical machines
  Last known set of volumes in form of volume ID that contains live space
  Last known set of volumes in form of volume ID that contains history space
  VAU table that contains information that describes each VAU in the SMS 200: allocation status, owner (SMS driver or Master Service), free space buckets, ID of the volume where VAU resides, etc.
VDI section:
  SMS objects database
  VDI relation tree that represents the parent/child relation of VDIs
  Regions in VDI ID space that allocated for specific physical machine It is noted that Master Service 400 allocates groups of available VDI IDs for each physical machine to let it be independent as much as possible from Master Service 400. SMS drivers 300 need new VDI ID when live or history flusher need to create a snapshot VDI. The live or history flusher does not want to wait for Master Service 400 that may have failed and to be in a failover process.

VDI Namespace Module 330

Turning now to VDI namespace module 330 of the SMS driver 300, the VDI namespace module 330 is configured to manage a vast number of VDIs for server virtualization in a human readable manner. Specifically, to facilitate administrative operations, the VDI namespace module 330 maintains several name spaces or views that represent various aspects of VDIs. Different views can be used for different I/O operations. In one embodiment, the VDI namespace module 330 provides an active VDI view, a parent-child ancestry view, a live VDIs view and an arbitrary view.

In an active VDI view/namespace, the VDI namespace module 310 provides a system-wide view of all active VDIs. The VDI namespace module 310 also allows each physical machine to handle active VDIs associated with the physical machine under the active VDI view. The active VDI view presents a list and aggregated status information on some or all active VDIs in the SMS 200. The VDI namespace module 330 can group all the active VDIs together based on the scope of view. In one embodiment, Master VDI maintains the list of all active VDIs in the SMS 200. Master Service 400 reflects this information in the SMS objects database. The Master VDI gets a list of VDIs running on a specific physical machine also from the objects database. VDI object contains corresponding physical machine ID. An active VDIs namespace has only 2 levels: root that contains set of subdirectories. Each subdirectory represents a physical machine—member of the SMS cluster, and contains list of active VDIs running on the corresponding physical machine.

The VDI namespace module 330 maintains full history of VDIs parent-child relationships that can be viewed as a tree. It helps administrators to visualize ancestry of VDIs and facilitate creation of virtual machines running with the appropriate disk images. Traversing this view allows the administrators to visualize the following information that represents parent-child relationship:

Chain of parents for a specific VDI

List of all children of a specified (by VDI ID) snapshot VDI

List of all snapshot VDIs of a specified (by VDI ID) live VDI

In one embodiment, the VDI namespace module 330 uses a file system directory structure to represent parent-child relation tree. A system administrator can traverse parent-child tree as a regular hierarchical tree starting from a grandparent VDI. The tree is build so that live VDIs are represented as leaves and are pushed down (root on top) the tree each time a new level of hierarchy is created. VDIs that have children or snapshots are represented as directories. Each directory contains a short file that describes whether this VDI has children and/or snapshots and how many, along with VDI ID, attributes, flags etc. There are also up to two files listing children and their corresponding snapshots. In most cases, VDIs that do not have children or snapshots are represented by the record in one of the list files—snapshot list file or children list file some other VDI. VDIs that do not have children or snapshots can also be represented as directories. In this case, the children and snapshot count is zero, and the list files are empty (or absent).

Figure 15:
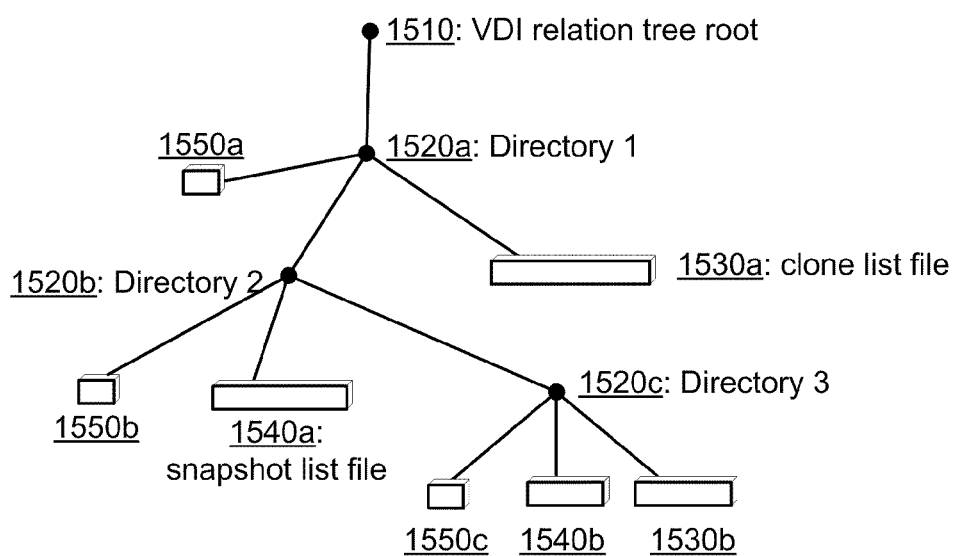
FIG. 15 is a diagram of an illustration of representing a hierarchy of virtual disk images using a file system directory structure according to one embodiment of the invention.

FIG. 15 is a diagram of an illustration of representing a hierarchy of VDIs using a file system directory structure 1500 according to one embodiment of the invention. The directory structure 1500 comprises a VDI relation tree root 1510, which represents the grand parent of the children in the structure. Under the VDI relation tree root 1510 is directory 1 (1520a) which represents a child of the grand parent/tree root 1510. Directory 1 (1520a) was created by cloning from the grand parent/tree root 1510. Directory 1 (1520a) has snapshots in the history space. Clone list file 1530a contains records that represent all these snapshots. Directory 1 (1520a) in some point in time was frozen and a snapshot VDI was created. The snapshot VDI is represented by Directory 2 (1520b) in the structure 1500. Later this snapshot VDI (i.e., Directory 2) was cloned several times. Live VDIs (including Directory 1 itself) are represented by records in snapshot list file 1540. Later one of these clones was also frozen and this event is represented by Directory 3 (1520c). In some point Directory 3 (1520c) snapshot was cloned (with several children represented by a file 1540b. Directory 3 (1520c) snapshot also has snapshots in history space that is represented by a file 1530b. Directory 1, Directory 2 or Directory 3, each has an associated file descriptor 1550, which contains information on VDI ID, snapshot/live flag.

The VDI namespace module 330 also manages an arbitrary hierarchy created for a particular job which can be external to the SMS objects. For example, a particular workflow of server virtualization is represented by grouping together VDIs that belong to this workflow regardless of their ancestry or parent-child relationship. The VDI namespace module 330 helps a SMS administrator to create the needed arbitrary hierarchy and directory content (tree leaf and VDIs). Each level of hierarchy is represented by a subdirectory in the tree. The system administrator uses the VDI namespace module 330 to create any number of arbitrary name space trees. Some of these arbitrary trees can be controlled by an application such as backup to represent VDIs involved in a particular job. Note that backup agent may notify Master Service 400 directly about start and completion of backup session (via pre-backup and post-backup scripts). These events cause inserting or removing VDIs to/from the backup specific group of VDIs.

The VDI namespace module 330 present the name space hierarchies, such as active, parent-child and arbitrary, as a hierarchical trees. A namespace browser—integrated with platform management software or standalone—sends VDI namespace requests to Master Service 400 for further process. For leaf nodes (representing specific VDIs), Master Service 400 returns a list of structures, which contains VDI name, VDI ID and VDI state. A SMS system administrator may require additional information about a specific VDI (for example, detailed status, I/O statistics, etc.) using VDI ID as an identification parameter. VDI ID is shared between a virtualization platform and the SMS 300 to identify the requested VDI.

Communication Interface 210

The SMS 200 communication has a star structure. Master Service 400 is in the center of the star and individual SMS drivers 300 are end points of the star. The communication interface 210 is configured to couple the individual SMS drivers 300 with Master Service 400. The individual SMS drivers 300 do not communicate with each other but only with Master Service 400 through one or more SMS internal communication protocols. Master Service 400 and each SMS driver 300 have a unique cluster ID that is used to implement a SMS internal protocol. Master Service 400 and each SMS driver 300 acquire their cluster ID from Master VDI upon SMS 200 boot procedure. Physical machines in SMS 200 are connected via a network connection, such as Ethernet. A SMS internal communication protocol is implemented on top of the Ethernet connection.

A SMS communication protocol supports both synchronous and asynchronous requests. The synchronous requests are logically similar to function calls—when returned the action is complete and the result is known. An asynchronous requests means that the action is queued and there is a form of notification (rendezvous) to deliver results of the action. From time to time a SMS driver 300 and Master Service 400 communicates to notify each other of certain events or ask for service. TABLE IV is an example of a list of communication requests in the SMS 300. Other embodiments may a list of different communication requests in the SMS 300. Those skilled in the art will recognize that there may be any number of other types of request with different functionality and different components.

TABLE IV

SMS Communication Request

| SMS Component | SMS Communication Requests |
|---|---|
| VDI Management | Create new empty VDI |
| | Destroy live VDI |
| | Destroy snapshot VDI |
| | Snapshot live VDI |
| | Clone snapshot VDI |
| | Available region of VDI IDs allocation for SMS driver |
| | Notification about VDI failure and I/O errors |
| | Statistics (I/O related, disk space related) |

TABLE IV-continued

SMS Communication Request

| SMS Component | SMS Communication Requests |
|---|---|
| Namespace | Handle notification from live or history flusher that snapshot VDI has been created to reflect that in VDI namespace |
|  | Handle notification that snapshot VDI has been merged and destroyed |
| VAU Management | VAU allocation for SMS drivers upon request |
|  | VAU rebalance (take assigned VAU back to assign them to another more needy physical machine) |
|  | Releasing ownership of VAUs (a SMS driver gives up VAU ownership if VAU is full) |
| VDI Connect/Disconnect | Translation of VDI ID into root map block pointer upon VDI connection |
| Arbitration | Final object database update when VDI switches from active to inactive state (e.g., new root map location and statistics) |
| SMS Backup | Assign physical machine to flush whole Log that belonged to a physical machine that crashed. |
| VAU | Owner (physical machine ID; 0 means Master) |
|  | Available size |

SMS Cluster

Figure 17:
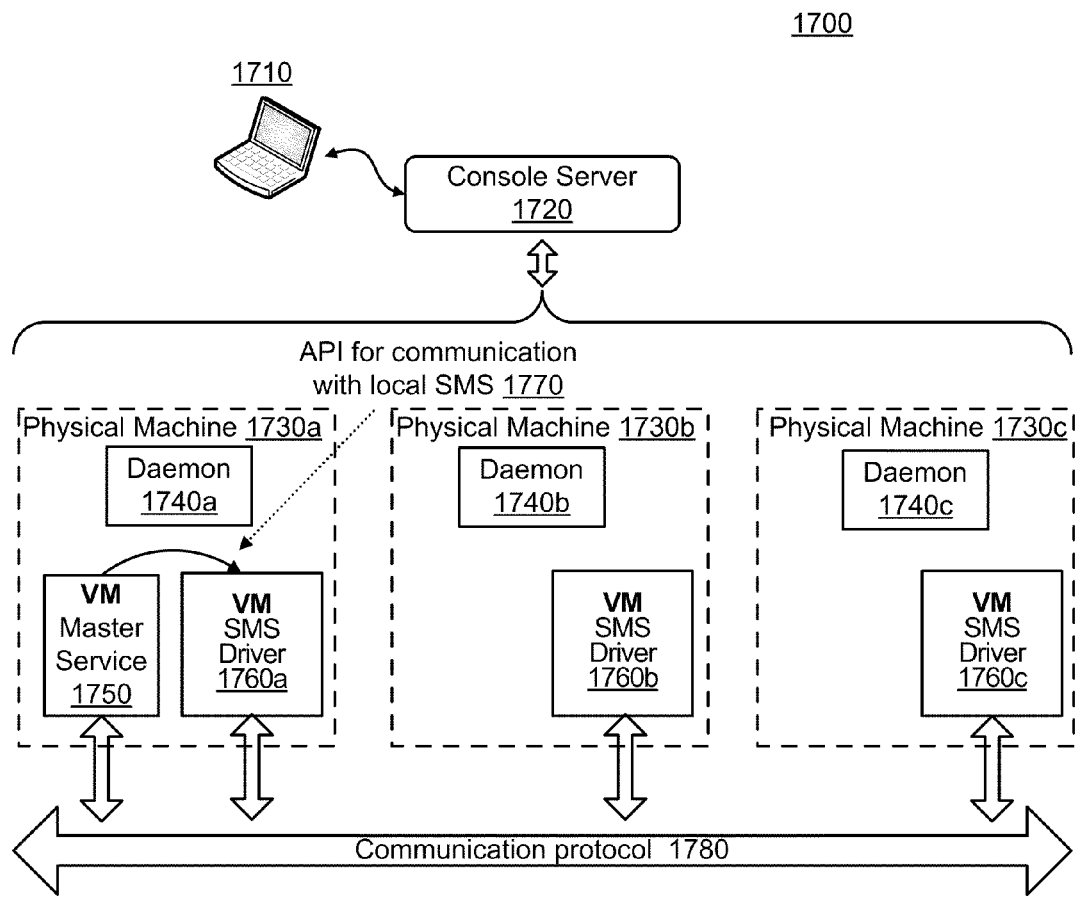
FIG. 17 is a diagram of an example of a system management system cluster as a part of a large cluster controlled by a virtualization platform according to one embodiment of the invention.

FIG. 17 is a diagram of an example of a SMS cluster 1700 as a part of a large cluster controlled by a virtualization platform according to one embodiment of the invention. The SMS cluster 1700 comprises a client 1710, a console server 1720 and multiple physical machines 1730a-c. The console server 1720 is responsible for communication with a system administrator using the client 1710. The console server 1720 is configured to keep configurations for all virtual machines and applications that run on the SMS cluster 1700. Each physical machine 1730 has a management daemon 1740 (e.g., xend) and multiple virtual machines. Each virtual machine has a SMS driver 1760 running on it. The management daemon 1740 is responsible for performing specific commands on a particular physical machine 1730 on behalf of the console server 1720. This is how the system administrator initiates commands like create/destroy VDI.

When a virtual machine starts, the console server 1720 decides which physical machine 1730 to use, and asks the management daemon 1740 to create and start the virtual machine according to its configuration. The management daemon 7140 performs one or more steps to create a virtual CPU, memory, buses, and connects the required devices, after which the newly created virtual machine starts execution. One of the virtual machine of a physical machine (e.g., 1730a) is selected to be Master Service 1750.

As some of the devices that are being connected in a virtual machine are VDIs backed up block devices, the SMS driver 1760 associated with the virtual machine is notified at this stage as well. The management daemon 1740 of a physical machine 1730 communicates with the SMS driver 1760 on this physical machine 1730 using an API. The management daemon 1740 provides the set of VDI IDs that correspond to virtual disks for virtual machine being started. The SMS driver opens required VDIs. Starting from this moment, the SMS instance 1760 is set to perform I/O operations from guest virtual machine.

The SMS cluster 1700 has its own internal communication protocol 1780 among Master Service 1750 and SMS drivers 1760a-c. Master Service 1750 in turn has a special communication channel 1770 with the SMS driver 1760 on the same physical machine. This communication channel is used by Master Service 1750 to perform its operations when access to low level storage is needed. In one embodiment, communication messages in the SMS cluster 1700 can be classified as following:

Administrative messages—from the console server 1740 to a SMS driver 1760
  Discover total and available SMS storage capacity
  Create/destroy VDI
  Snapshot/clone VDI
  Display, search, etc. VDI namespace
  Add/remove physical machine to/from the SMS cluster
  Add/remove/reallocate storage volumes to/from SMS shared storage pool
Notification messages—from the SMS driver 1760 to the console server 1720:
  Asynchronous notifications or rendezvous for command completions
  Alerts (runtime failure)
VDI runtime control messages—from the console server 1720 or management daemon 1740 to the SMS driver 1760:
  Connect/disconnect VDI
  Runtime active VDI commands, such as make a clone now when it's all consistent.

As noted above, the storage management system 200 provides the functionality that enables server virtualization in data centers with enhanced system performance. For example, the storage management system 200 provides support for managing large volumes of data storage device, e.g., millions of different volumes of data storage devices. Complex server virtualization operations, such as taking a snapshot of a whole OS image and continuing its execution at a later time form the exact point it was stopped, are efficiently supported by the disclosed storage management system 200.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims of this application. As will be understood by those familiar with the art, the invention may be embodied in other specific forms without departing from the spirit or essential characteristics thereof. Likewise, the particular naming and division of the modules, routines, features, attributes, methodologies and other aspects are not mandatory or significant, and the mechanisms that implement the invention or its features may have different names, divisions and/or formats. Furthermore, as will be apparent to one of ordinary skill in the relevant art, the modules, routines, features, attributes, methodologies and other aspects of the invention can be implemented as software, hardware, firmware or any combination of the three. Also, wherever a component, an example of which is a module, of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the invention is in no way limited to implementation in any specific programming language, or for any specific operating system or environment. Accordingly, the disclosure of the invention is intended to be illustrative, but not limiting, of the scope of the invention, which is set forth in the following claims.

What is claimed is:

1. A computer method for providing storage management to a system of a plurality of virtual machines running on a set of physical machines in a data center, the method comprising:
    storing data in a plurality of physical storage devices of the data center, a physical storage device of the plurality of the physical storage devices representing a physical address space and the physical address space being logically divided into a plurality of physical storage spaces;
    providing an abstraction of the plurality of the physical storage devices to the plurality of virtual machines, wherein the abstraction of the plurality of the physical storage devices is represented by a plurality of corresponding virtual disk images, a virtual disk image of a physical storage device of the plurality of the physical storage devices represents a virtual address space of the physical address space of the physical storage device, and each of the plurality of virtual machines are associated with one of a plurality of storage management system drivers; and
    configuring a master service in one of the set of physical machines to manage the abstraction of the plurality of the physical storage devices and storage space allocation to the plurality of virtual machines by maintaining a system-wide mapping to translate identifications for virtual disk images to a corresponding position in the plurality of physical storage devices for the plurality of virtual machines running on the set of physical machines.

2. The method of claim 1, wherein providing an abstraction of the plurality of the physical storage devices comprises:
    presenting the plurality of virtual disk images to the plurality of virtual machines, the virtual disk image being an image of a physical storage device of the plurality of the physical storage devices visible to the virtual machine associated with the storage management system driver;
    managing the physical address space of a physical storage device visible to the virtual machine associated with the storage management system driver; and
    managing a plurality of virtual disk images in human readable manner.

3. The method of claim 2, wherein the virtual disk image represents a live virtual disk image being accessed by the virtual machine associated with the storage management system driver.

4. The method of claim 2, wherein the virtual disk image represents a snapshot of a live virtual disk image being accessed prior to current time by the virtual machine associated with the storage management system driver.

5. The method of claim 2, wherein presenting the plurality of virtual disk images comprises mapping a logical address for a data block in a data block access request to one or more physical addresses for the data block being requested in a physical storage device of the plurality of the physical storage devices.

6. The method of claim 2, wherein managing the physical address space of a storage device comprises dividing the physical address space of the physical storage device into a log space and a live space.

7. The method of claim 6, wherein the log space comprises a data log storing a plurality of data sequentially written into the log space.

8. The method of claim 6, wherein the log space further comprises a history data flusher and live data flusher, wherein the history data flusher is configured to flush the data in the log space into a history space, and the live data flusher is configured to flush the data in the log space into the live space.

9. The method of claim 8, further comprises mapping the data from live space to log space using a lazy-cutoff method including:
    maintaining a valid address range in the log space;
    checking every address reference for validity against this range; and
    fetching correct physical address from the live space when necessary.

10. The method of claim 9, wherein the lazy-cutoff method further comprises:
    writing to a log mark registry responsive to a data block allocation request, the log mark registry being associated with a plurality of virtual disk images being allocated in a first physical machine;
    copying the log mark registry to a second physical machine;
    creating a log mark in the second physical machine for the plurality of the virtual disk images being allocated;
    flushing log data into a live space in the first physical machine and the second physical machine; and
    responsive to the flushing reaching a predetermined point in the log mark registry, invalidating data in the log mark registry in the first physical machine.

11. The method of claim 2, wherein managing a plurality of virtual disk images in human readable manner comprises providing one of a group of system views of the virtual disk images, comprising:
    an active virtual disk view, configured to provide a system-wide view of all active virtual disk images used by the virtual machine;
    a parent-child ancestry view, configured to provide one or more parent-child relationships among the virtual disk images used by the virtual machine; and
    an arbitrary view, configured to manage an arbitrary hierarchy among the virtual disk images responsive to a workflow needed by the virtual machine.

12. The method of claim 1, wherein configuring the master service further comprises:
    providing a system-wide virtual disk image identification to root map block translation for the system-wide mapping to translate identifications for virtual disk images to the corresponding position in the plurality of physical storage devices;
    allocating physical address space to the virtual disk images responsive to an allocation request from one of the plurality of the storage management system drivers;
    maintaining a storage management objects database, the objects database comprising a plurality of storage objects; and communicating with the plurality of the storage management system drivers using one or more communication protocols.

13. The method of claim 1, wherein each of the plurality of virtual machines is associated with a dedicated storage management system driver.

14. A computer system for providing storage management to a system of a plurality of virtual machines running on a set of physical machines in a data center, the system comprising:
   a plurality of physical storage devices configured to store data in the data center, a storage device of the plurality of the physical storage devices representing a physical address space and the physical address space being logically divided into a plurality of storage spaces;
   a plurality of storage management system drivers communicatively coupled with the plurality of the storage devices, a storage management system driver of the plurality of the storage management system drivers associated with one of the plurality of virtual machines and configured to provide an abstraction of the plurality of the physical storage devices to the virtual machine the storage management system driver being associated with, wherein the abstraction of the plurality of the physical storage devices is represented by a plurality of corresponding virtual disk images, and a virtual disk image of a physical storage device of the plurality of the physical storage devices represents a virtual address space of the physical address space of the physical storage device; and
   a master service running on one of the plurality of virtual machines coupled with the plurality of the storage management system drivers and configured to manage the abstraction of the plurality of the physical storage space and storage space allocation to the plurality of virtual machines by maintaining a system-wide mapping to translate identifications for virtual disk images to a corresponding position in the plurality of physical storage devices for the plurality of virtual machines running on the set of physical machines.

15. The system of claim 14, wherein the storage management system driver associated with a virtual machine of the plurality of the virtual machine comprises:
   a virtual disk image management module configured to present the plurality of the virtual disk images to the plurality of virtual machines, the virtual disk image being an image of a physical storage device of the plurality of the physical storage devices visible to the virtual machine associated with the storage management system driver;
   a storage space management module configured to manage the physical address space of a physical storage device visible to the virtual machine associated with the storage management system driver; and
   a virtual disk image namespace module configured to manage a plurality of virtual disk images in human readable manner.

16. The system of claim 14, wherein the virtual disk image is configured to represent a live virtual disk image being accessed by the virtual machine associated with the storage management system driver.

17. The system of claim 14, wherein the virtual disk image is configured to represent a snapshot of a live virtual disk image being accessed prior to current time by the virtual machine associated with the storage management system driver.

18. The system of claim 14, wherein the virtual disk image management module further comprises one or more virtual disk image maps, a virtual disk map configured to map a logical address for a data block in a data block access request to one or more physical addresses for the data block being requested in a storage device of the plurality of the physical storage devices.

19. The system of claim 14, wherein the storage space management module is configured to divide the physical address space of a physical storage device into a log space and a live space.

20. The system of claim 19, wherein the log space comprises a data log storing a plurality of data sequentially written into the log space.

21. The system of claim 19, wherein the log space further comprises a history data flusher and live data flusher, wherein the history data flusher is configured to flush the data in the log space into a history space, and the live data flusher is configured to flush the data in the log space into the live space.

22. The system of claim 14, wherein the virtual disk image namespace module is further configured to provide one of a group of system views of the virtual disk images, comprising:
   an active virtual disk view, configured to provide a system-wide view of all active virtual disk images used by the virtual machine;
   a parent-child ancestry view, configured to provide one or more parent-child relationships among the virtual disk images used by the virtual machine; and
   an arbitrary view, configured to manage an arbitrary hierarchy among the virtual disk images responsive to a workflow needed by the virtual machine.

23. The system of claim 14, wherein the master service is further configured to:
   provide a system-wide virtual disk image identification to root map block translation for the system-wide mapping to translate identifications for virtual disk images to the corresponding position in the plurality of physical storage devices;
   allocate physical address space to the virtual disk images responsive to an allocation request from one of the plurality of the storage management system drivers;
   maintain a storage management objects database, the objects database comprising a plurality of storage objects; and
   communicate with the plurality of the storage management system drivers using one or more communication protocols.

24. A non-transitory computer-readable storage medium storing computer programs instructions executed by a computer processors for providing storage management to a system of a plurality of virtual machines running on a set of physical machines in a data center, the computer program instructions comprising instructions for:
   storing data in a plurality of physical storage devices of the data center, a physical storage device of the plurality of the physical storage devices representing a physical address space and the physical address space being logically divided into a plurality of physical storage spaces;
   providing an abstraction of the plurality of the physical storage devices to the plurality of virtual machines, wherein the abstraction of the plurality of the physical storage devices is represented by a plurality of corresponding virtual disk images, a virtual disk image of a physical storage device of the plurality of the physical storage devices represents a virtual address space of the physical address space of the physical storage device, and the plurality of virtual machines are associated with one or more of storage management system drivers; and configuring a master service in one of the set of physical machines to manage the abstraction of the plurality of the physical storage devices and storage space allocation to the plurality of virtual machines by maintaining a system-wide mapping to translate identifications for virtual disk images to a corresponding position in the plurality of physical storage devices for the plurality of virtual machines running on the set of physical machines.

25. The computer-readable storage medium of claim 24, wherein the computer program instructions for providing an abstraction of the plurality of the physical storage devices comprise computer program instructions for:
  presenting the plurality of the virtual disk images to the plurality of virtual machines, the
  virtual disk image being an image of a physical storage device of the plurality of the physical storage devices visible to the virtual machine associated with the storage management system driver;
  managing the physical address space of a physical storage device visible to the virtual machine associated with the storage management system driver; and
  managing a plurality of virtual disk images in human readable manner.

* * * * *